(12) United States Patent
Cantu et al.

(10) Patent No.: US 6,268,613 B1
(45) Date of Patent: Jul. 31, 2001

(54) MULTIPLE-HEAD PHOSPHOR SCREEN SCANNER

(75) Inventors: Gary Cantu, Foster City; Wayne Evans, Campbell; Todd Lewis, Palo Alto, all of CA (US)

(73) Assignee: Phormax Corporation, Palo Alto, CA (US)

( * ) Notice: Subject to any disclaimer, the term of this patent is extended or adjusted under 35 U.S.C. 154(b) by 0 days.

(21) Appl. No.: 09/260,890

(22) Filed: Mar. 2, 1999

(51) Int. Cl.$^7$ ................................................... G03B 42/02
(52) U.S. Cl. ........................... 250/584; 250/586; 250/585
(58) Field of Search .................................. 250/584, 585, 250/586, 589, 484.4, 234, 235, 236, 559.06

(56) References Cited

U.S. PATENT DOCUMENTS

| | | |
|---|---|---|
| 4,758,062 | 7/1988 | Sunagawa et al. . |
| 4,778,995 | 10/1988 | Kulpinski et al. . |
| 4,886,968 | 12/1989 | Ohnishi et al. . |
| 5,144,135 | * 9/1992 | Hendrix et al. ........................ 250/580 |
| 5,859,441 | 1/1999 | Muraishi . |

FOREIGN PATENT DOCUMENTS

| | | |
|---|---|---|
| 0482676 | 4/1992 | (EP) . |
| 64-6918 | 1/1989 | (JP) . |
| 64-6919 | 1/1989 | (JP) . |
| 1-205148 | 8/1989 | (JP) . |
| 403002746 | * 1/1991 | (JP) ........................................ 250/585 |
| 3-221940 | 9/1991 | (JP) . |

OTHER PUBLICATIONS

Translation of Japanese Patent Publication JP 403002746 to Shibata, pp. 1–8.

* cited by examiner

*Primary Examiner*—Georgia Epps
*Assistant Examiner*—Richard Hanig
(74) *Attorney, Agent, or Firm*—Townsend and Townsend and Crew LLP

(57) ABSTRACT

A multiple-head scanning device (20) for reading an image stored on a photostimulable phosphor storage screen (10), comprising, a rotatable frame having a center (13) and an outer perimeter (15); a photomultiplier tube (40) mounted to the rotatable frame at a location proximal the center (13) of the rotatable frame; a plurality of radially extending optical trains (12) mounted to the rotatable frame at 120 degrees to one another, each optical train (12) configured to direct incident laser light towards phosphor storage screen (10) and to direct response radiation emitted by phosphor storage (10) screen in response to the incident laser light towards the photomultiplier tube (40).

71 Claims, 18 Drawing Sheets

MULTIPLE-HEAD PHOSPHOR SCREEN SCANNER

The present invention relates to methods and devices for reading images stored on photostimulable media, and in particular to reading images stored on phosphor radiation screens.

BACKGROUND OF THE INVENTION

The use of photostimulable phosphor image storage screens as a replacement for an x-ray film and other sensors is well known. Phosphor image screens work by trapping individual x-ray photons in a storage layer. The latent image trapped in the screen can then be read by scanning the storage layer using a suitable wavelength excitation beam, preferably from a focussed laser. The laser excitation beam causes the screen to release the latent image in the form of emitted stimulable phosphor light that is proportional to the x-ray energy applied to the screen during exposure. The emitted light is collected by an optical system and is converted into an electronic signal proportional to the emitted light. The electrical signal is then converted into a digital value and passed to a computer which generates and stores an image file. The image file can then be displayed as a representation of the original radiograph, with image enhancement software applied to augment the radiographic information.

Various known systems for moving a scanning head or directing a scanning beam across image or data storage screens are known. In one family of systems, an X-Y raster scan is taken as follows. The scanning head or beam first scans in a straight line across the screen in an X direction. The screen is then moved a short incremental distance in the Y direction. (Alternatively, the scanning head or the optics directing the beam can be moved incrementally in the Y direction). Thereafter, an X directional scan is repeated. Accordingly, by scanning back and forth in one direction, while intermittently advancing the screen (or re-directing the scanning beam), in a perpendicular direction, an X-Y raster scan is generated. In a second family of systems, the image or data storage screen is mounted to a rotating drum which is rotated about a center point in the plane of the screen while a scanning head is moved radially across the screen in a direction outwardly from the center point.

A problem common to both families of scanning systems is the problem of precisely controlling the movement of the scanning head, (or the movement of the optical system, such as a galvanometric mirror, directing the scanning beam). This is partially because the scanning head or scanning beam optics must be rapidly moved back and forth in at least one direction with the speed of such movement being constantly and quickly changing. Accordingly, scanning heads or scanning beam optical systems which rapidly move back and forth are typically subject to accelerations which cause problems including mechanical wear and failure and reduce read efficiency (ie: duty cycle) time to less than 100%. Accordingly, problems exist when attempting to accurately position such a moving scanning head or beam direction system to direct an incident beam at a desired location on the phosphor screen.

A second problem of existing systems is that such systems are configured such that the response radiation emitted by the screen is not directed back through the same optical train to a light detector, and as such a first optical train is required to direct and focus the incident light on the screen, and a second optical train is required to detect and measure the response radiation emitted by the screen.

It would instead be desirable to provide a system for high speed scanning of a phosphor screen, (or any other photostimulable media), which moves a scanning beam head in a path across the surface of the phosphor screen to generate a raster scan, yet avoids the problems of controlling the back and forth movement of the scanning head across the screen. It would also be desirable to avoid potential inaccuracies, control and wear and tear problems caused by acceleration forces moving such a scanning head back and forth in one or two directions, at the same time achieving 100% duty cycle read efficiency.

Moreover, it would be desirable to create a high speed scanning system which has minimal dead time during its operation such that a near continuous data stream can be generated as the phosphor screen is scanned.

Additionally, it would be desirable to create a high speed scanning system which does not require a transport mechanism which either moves the phosphor screen in two perpendicular directions (such as would be accomplished with an X-Y transport mechanism), or rotates the phosphor screen.

Additionally, it would be desirable to create a high speed scanning system which uses the same optical path for phosphor screen stimulation and data collection.

SUMMARY OF THE INVENTION

The present invention provides systems and methods for scanning a photostimulable media, (which may preferably comprise a phosphor storage screen), with a rotating multihead scanning device positioned thereover, or adjacent thereto. In one aspect of the present invention, a curved line raster scan is made of the phosphor screen, with the image data acquired in polar coordinate form. Using appropriate geometric algorithms, the polar coordinate form image is then transformed into an X-Y Cartesian form.

In preferred aspects of the invention, the rotating multihead scanning device comprises a rotatable frame positioned over the phosphor screen. A plurality of radially extending optical trains are mounted to the rotatable frame such that laser light is directed downwardly toward the phosphor screen from scanning heads located at the outer perimeter of the rotatable frame, and such that response radiation emitted by the phosphor screen is received by the scanning heads and directed radially inwardly towards a centrally located light detector which may preferably comprise a photomultiplier tube, but may, for example, also comprise a photodiode.

The frame is rotated about its center such that each of the scanning heads at the perimeter of the frame pass over the phosphor screen in an arcuate path, one after another. As will be explained, each scanning head focuses its incident laser beam at positions which are equal distances from the center of the scanning device. Concurrently with the rotation of the scanning device, the phosphor screen is preferably advanced in a Y direction underneath the rotating scanning device. In a first aspect of the invention, the center of the rotating scanning device is held at a fixed position above the phosphor screen while a transport mechanism, which may comprise a series of rollers and guides or a transport mechanism, moves the phosphor screen under the rotating scanning device. In an alternate aspect of the invention, the transport mechanism is mounted to the rotating scanning device to move the rotating scanning device across the surface of the stationary phosphor screen. In either case, a curved raster scan of the phosphor screen is generated by rotating a plurality of optical trains over the phosphor screen as the rotating scanning device is moved in one direction across the surface of the phosphor screen.

In a preferred embodiment, the plurality of radially extending optical trains comprises three radially extending optical trains, each being spaced 120° apart from one another. In alternate embodiments, two radially extending optical trains spaced 180° apart or four radially extending optical trains spaced 90° apart may also be used. Moreover, keeping within the scope of the present invention, more than four equally spaced apart optical trains may also be used.

In a preferred aspect of the invention, each optical train comprises its own laser source and a single photomultiplier tube is mounted at the center of the rotating scanning device for measuring the response radiation emitted by the phosphor screen.

Each of the plurality of optical trains is preferably operated in sequence such that only one scanning head is actively scanning across the surface of the phosphor screen at a time. By activating the individual laser sources dedicated to each optical train in sequence, (or by selectively receiving the data signal from each optical train in sequence when the individual laser sources dedicated to each optical train are all operating simultaneously), an advantage of the present invention is that only one centrally-located photomultiplier tube needs to be used to gather image data from each of the three separate optical trains. By using a single centrally mounted photomultiplier tube with the plurality of scanning head optical trains, an advantage is not having to calibrate the correlation among more than one photomultiplier tube. Moreover, by using only one single photomultiplier tube, (as opposed to a separate light detector for each optical train), a lower cost system is provided having a greater mean statistical system reliability.

In various preferred embodiments of the optical train, each optical train comprises a laser located proximal to the center of the rotatable frame and a reflecting mirror located at the outer perimeter of the rotatable frame. A dichroic mirror is used to separate incident laser light from response radiation emitted by the phosphor screen such that only the response radiation is directed to a photomultiplier tube. In various aspects of these embodiments, the dichroic mirror may either be mounted proximal to the center of the rotatable frame (near the laser) or alternatively may be mounted at the outer perimeter of the rotatable frame.

In other preferred embodiments of the optical train, each optical train comprises a laser located at the outer perimeter of the optical train. A dichroic mirror mounted at the outer perimeter of the optical train is used to separate incident laser light from response radiation emitted by the phosphor screen such that only the response radiation is directed to the photomultiplier tube.

In a preferred aspect of the embodiment of the present invention using three optical trains spaced 120° apart, the rotating three-head scanning device is constructed such that the "optical radius", (defined herein as the radial distance from the center of the scanning device to the focal point of the laser beam on the phosphor screen under each scanning head) is at least 1.1547 (ie: 1/SIN(60°)) times one-half the width of the phosphor storage screen. Assuming the scanning heads are positioned at the perimeter of the scanning device, 120 degrees apart, and that the focal point of each laser beam lies exactly at the perimeter of the scanning device, then the scanning device will have an optical diameter of 1.1547 times the width of the phosphor screen. (The "optical diameter" being defined herein as double the distance of the "optical radius"). By mounting the scanning heads such that the optical diameter of the system is exactly 1.1547 times the width of the phosphor storage screen, a number of important advantages result. For example, when rotating three equidistant, 120 degree spaced-apart scanning heads above the phosphor storage screen, each of the separate scanning heads will pass completely over the phosphor screen (in an arcuate path) one after another in sequence. Accordingly, immediately after the first scanning head scans completely across the phosphor screen and reaches a position just off the surface of the phosphor screen, a second scanning head will simultaneously move into position to generate its own arcuate scan across the surface of the phosphor screen, thereby achieving 100% duty cycle read efficiency. Similarly, after the second scanning head has completed its scan across the phosphor screen, the third scanning head will move into position to generate its own arcuate scan across the surface of the phosphor screen.

An additional advantage of having the "optical radius", (ie the radial distance from the center of the scanning device to the focal point of the laser beam on the phosphor screen under each scanning head) be 1.1547 times one-half the width of the phosphor storage screen is that destructive reading is avoided at the edges of the phosphor screen, as will be explained.

In additional aspects of the three head design of the present invention, the system's optical radius is somewhat larger than 1.1547 times one-half the width of the phosphor storage screen. When using three equidistantly spaced-apart scanning heads, a "data time gap" will exist between each of the scanning heads. This "data time gap" is caused by the fact that the first scanning head will have passed some distance off the surface of the phosphor screen before the second scanning head passes onto the surface of the phosphor screen. It may be desirable to have such a data time gap between the signals read by each of the various scanning heads. For example, such a data time gap can be used to initialize the data gathering system before each scanning head passes over the surface of the phosphor screen. Such a data time gap can also be used to clearly separate the signals between each of the three scanning heads.

When using three 120 degree spaced apart optical trains having scanning heads with the system's optical radius being less than 1.1547 times one-half the width of the phosphor storage screen, more than one scanning head will be passing across the surface of the phosphor screen at a time. In such an arrangement, it would not be possible to use a single centrally located photomultiplier tube to distinguish between the signals of the three scanning heads.

When using three separate scanning heads, (spaced apart at 120 degrees to one another), with the system's optical radius being 1.1547 times one-half the width of the phosphor storage screen, each scanning head will scan in arcuate path across the screen, one at a time. Therefore, it is possible to have each individual scanning head scan sequentially such that very soon after one scanning head completes an arcuate raster scan across the surface of the phosphor screen, the next scanning head will complete a similar raster scan across the phosphor screen surface.

In one aspect, the dedicated laser for each optical train is turned on and off in sequence such that only one laser (ie: the laser in the optical train actively scanning over the surface of the phosphor screen) is activated at a time.

Alternatively, it is also possible to have the dedicated laser in each of the optical trains operating at the same time. In this case, mechanical shielding of the phosphor screen is used such that only one optical train's laser beam reaches the surface of the phosphor screen at a time, as that optical train scans across the surface of the screen, thereby eliminating the need to sequentially activate and deactivate the individual lasers in each optical train.

Using a one dimensional transport mechanism, the phosphor screen can be moved relative to the rotating multi-head scanning device such that the arcuate path of the scanning head over the phosphor screen will advance such that a curved raster scan will be generated. Using appropriate software and algorithms, the curved raster scan can then be converted into a system of linear X-Y coordinates such that the image stored on a phosphor radiation screen can accurately be reproduced.

As such, the present invention provides a high speed system for moving a phosphor screen under multiple scanning heads, wherein each of the scanning heads are maintained at fixed positions on the frame of the scanning device. Accordingly, an important feature of the present invention is that it is not necessary to repeatedly move scanning heads radially back and forth on the scanning device as the various scanning heads pass over the phosphor screen. This substantially reduces wear and tear on the system providing a long-life, high-speed device which has substantially fewer moving parts than existing scanner designs. Moreover, the present invention is balanced and has a slim aerodynamic profile for high speed rotation about its center.

In an alternate aspect of the invention, the phosphor screen is oriented perpendicular to the plane of the scanning device with the phosphor screen being wrapped partially around the edge of the scanning device. When using the present three head scanner design, the phosphor screen is preferably wrapped with its edges spaced 120 degrees apart relative to the scanning device. When using a two head scanner, the phosphor screen is preferably wrapped with its edges spaced 180° apart relative to the scanning device; and when using a four head scanner, the phosphor screen is preferably wrapped with its edges spaced 90° apart relative to the scanning device. (In such arrangements, only one scanning head will be passing over the surface of the phosphor screen at a time). In these alternate aspects of the invention, each scanning head focuses the laser beam radially outwardly in a direction parallel to the plane of the scanning device. In the various aspects of the present system, the only necessary moving parts are a system to rotate the scanning device about its central axis and a system to advance the motion of the phosphor screen in one dimension. By moving the phosphor screen relative to the rotating scanning device, high resolution scanning can be achieved as the phosphor screen can be advanced in very small increments relative to the path of the scanning head passing thereover. Accordingly, a pixel by pixel resolution of the image can be derived.

DESCRIPTION OF THE PREFERRED EMBODIMENTS

Overview

Figure 1A:
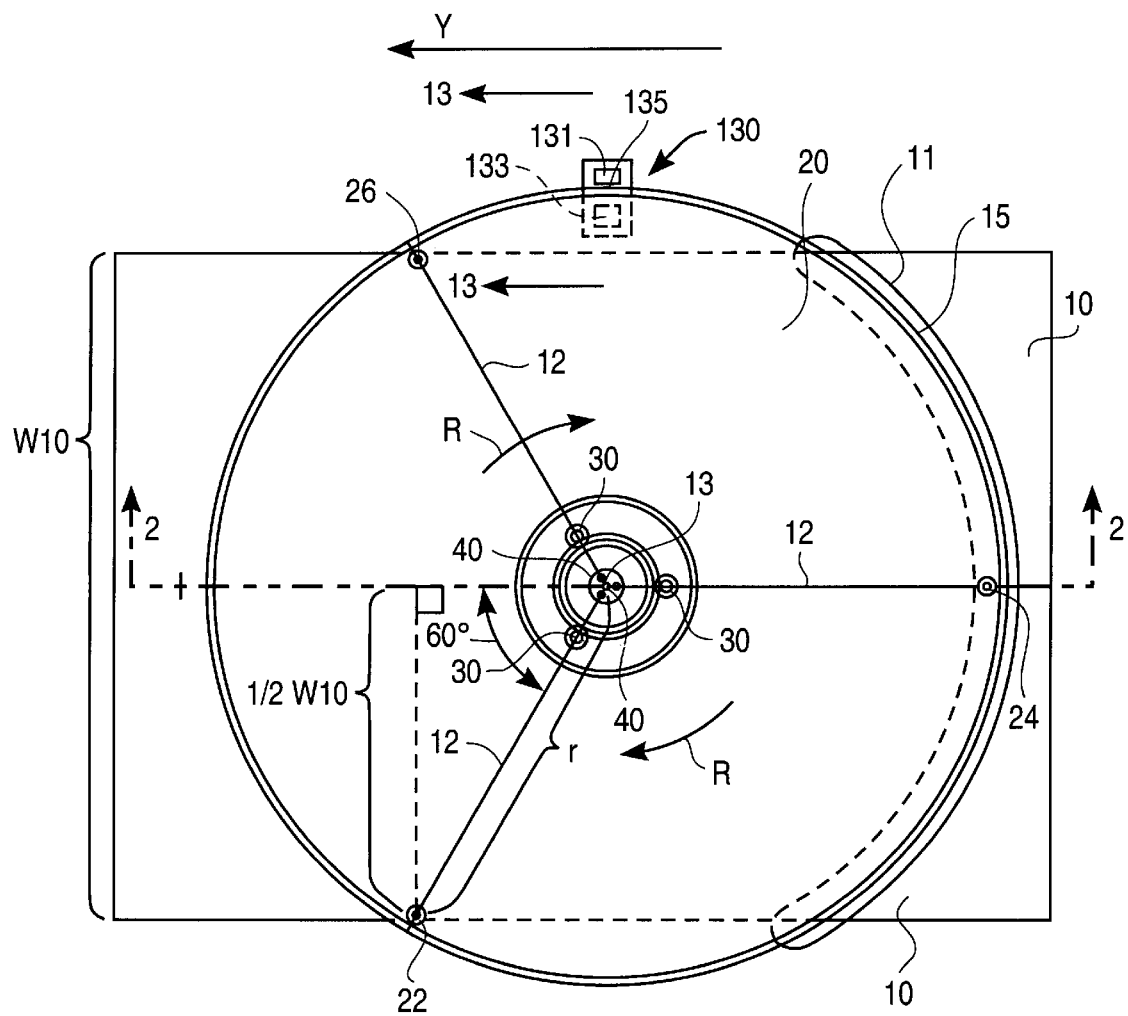
FIG. 1A is a top plan view of a first preferred embodiment of the present invention incorporating three radially extending optical trains mounted at 120° to one another, with the "optical radius" (ie: the radial distance from the center of the scanning device to the focal point of the laser beam under each scanning head) being 1.1547 times one-half the width of the phosphor screen.
Figure 1B:
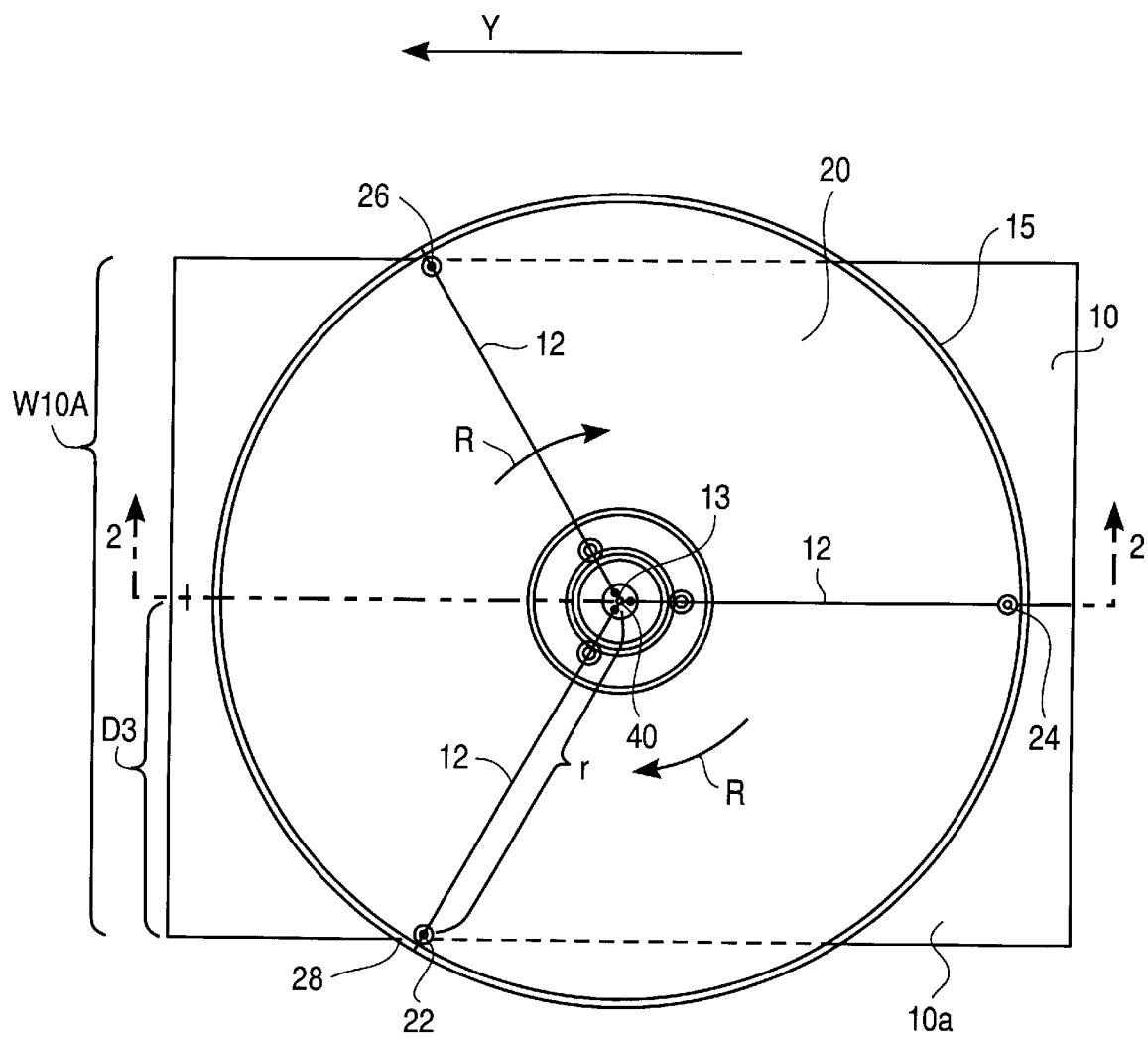
FIG. 1B is a top plan view of a second preferred embodiment of the present invention incorporating three radially extending optical trains mounted at 120° to one another, with the optical radius being slightly greater than 1.1547 times one-half the width of the phosphor screen.
Figure 2:
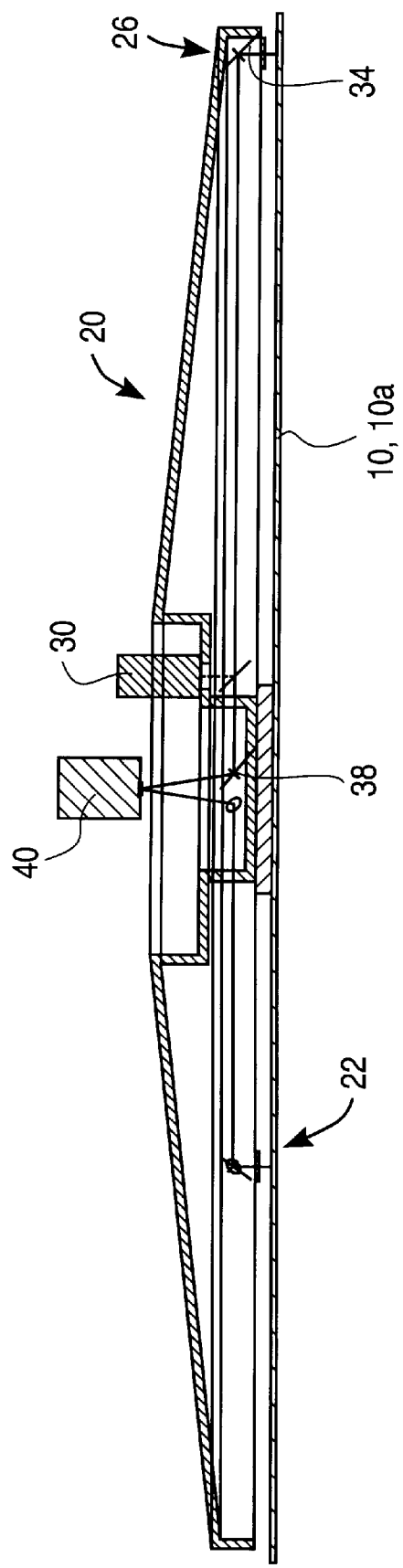
FIG. 2 is a side sectional view taken along the line 2—2 in FIG. 1A.

The present invention provides multiple head high-speed rotary scanning devices for reading an image on a phosphor screen and methods for its use. In a first embodiment of the present invention, FIGS. 1A and 1B show schematic top plan view of preferred aspects of a three-head rotary scanning device 20 according to the present invention as positioned over the surface of phosphor screen 10 and 10a respectively. Rotary scanning device 20 comprises three radially extending optical trains 12 oriented at 120° to one another on its underside. (The positions of optical trains 12 are shown schematically in FIGS. 1A and 1B, and the details of optical trains 12a, 12b and 12c are better seen in FIGS. 3 through 4C). In a preferred manner of operation, scanning device 20 is rotated about its center 13 in direction R as phosphor screen 10 is moved in direction Y. Rotation of scanning device 20 about center 13 can be accomplished by any conventional high speed motor and drive system that produces a constant speed of rotation of scanning device 20.

Alternatively, the speed of rotation of the scanning device can be measured and the data acquisition system can be synchronized to compensate for any minor variations in rotation speed. Translation of phosphor screen 10 in direction Y can be accomplished by attaching phosphor screen 10 to a motorized transport mechanism, such as a series of rollers and guides, or to a translation stage.

Each of the three optical trains 12 comprise a single scanning head (either 22, 24, or 26) which is disposed at a location at or near the outer perimeter 15 of scanning device 20, as shown. As will be explained, each individual optical train 12 and its associated scanning head, (being either scanning head 22, 24 or 26), operates to direct a focussed beam of incident laser light towards phosphor screen 10 and to receive response radiation emitted by phosphor screen 10. Using any one of a number of optical trains (such as optical trains 12a, 12b, 12c, 12d or 12e as will be described), response radiation received by the scanning head is separated from the incident laser light and is directed towards a centrally-located photomultiplier tube 40 for gathering image data, as will be explained.

Figure 3:
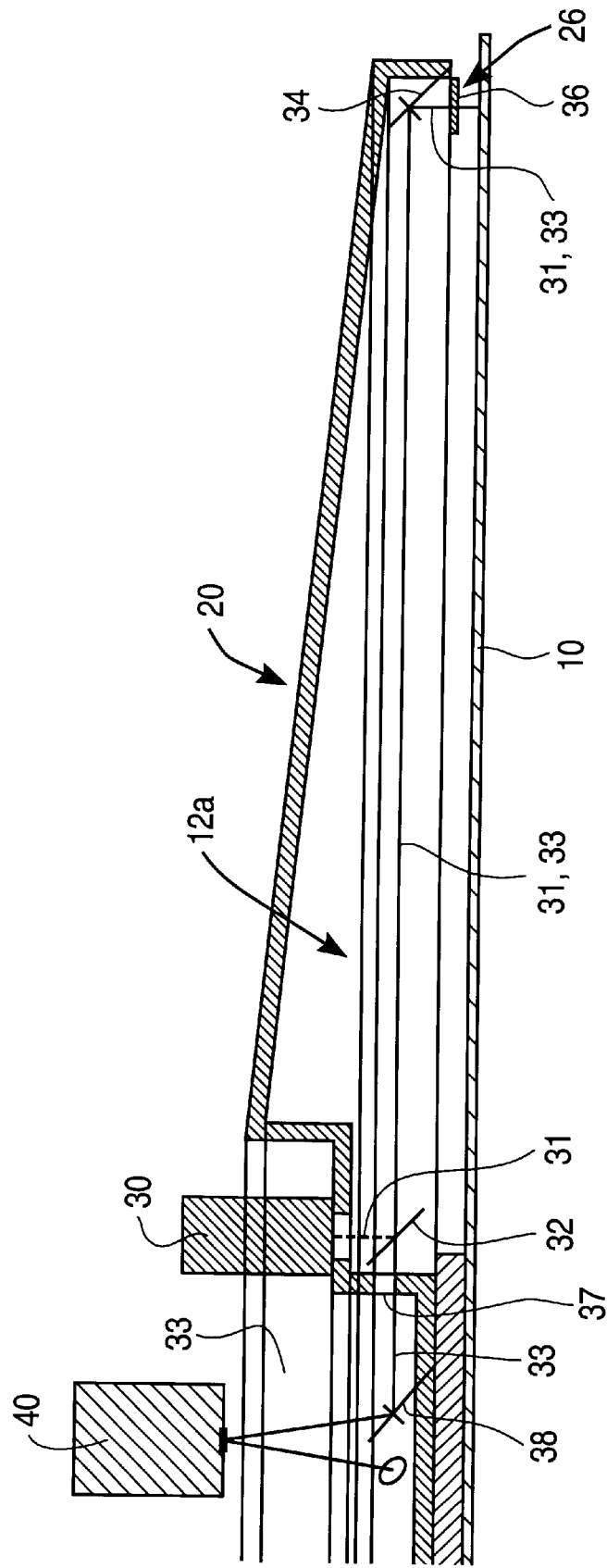
FIG. 3 is an enlarged view of a portion of FIG. 2.
Figure 4A:
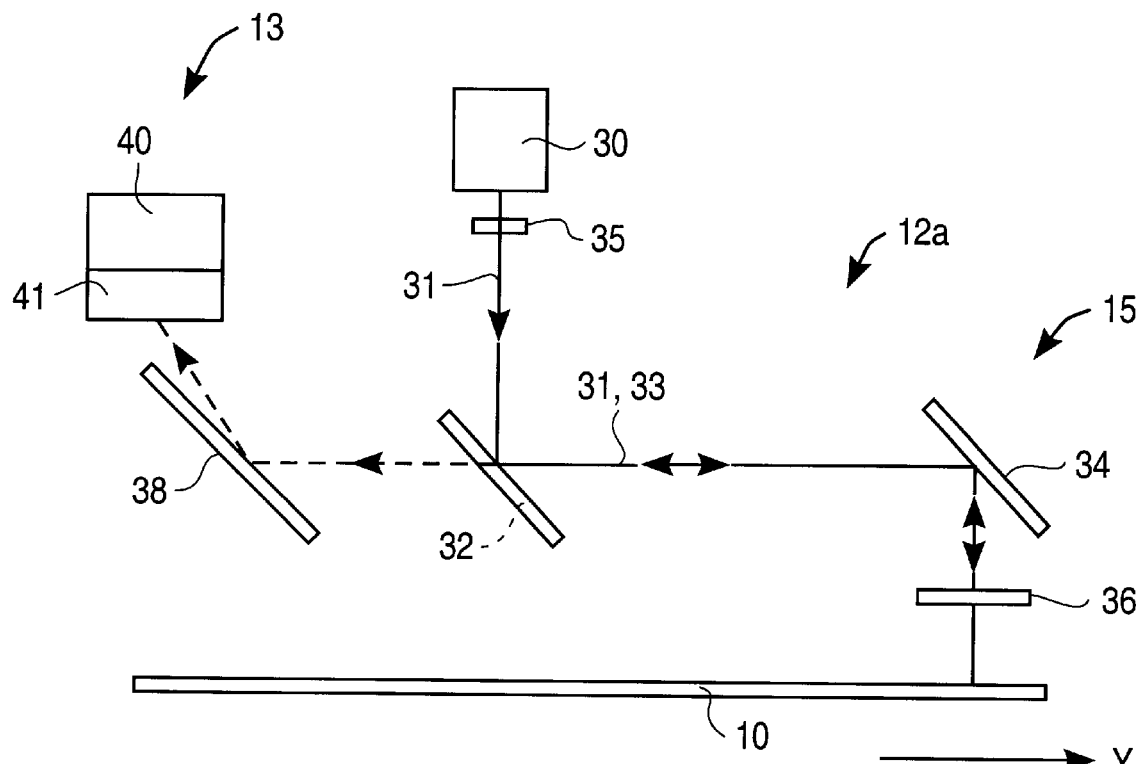
FIG. 4A is a schematic representation of the preferred optical train shown in FIG. 3.
Figure 4B:
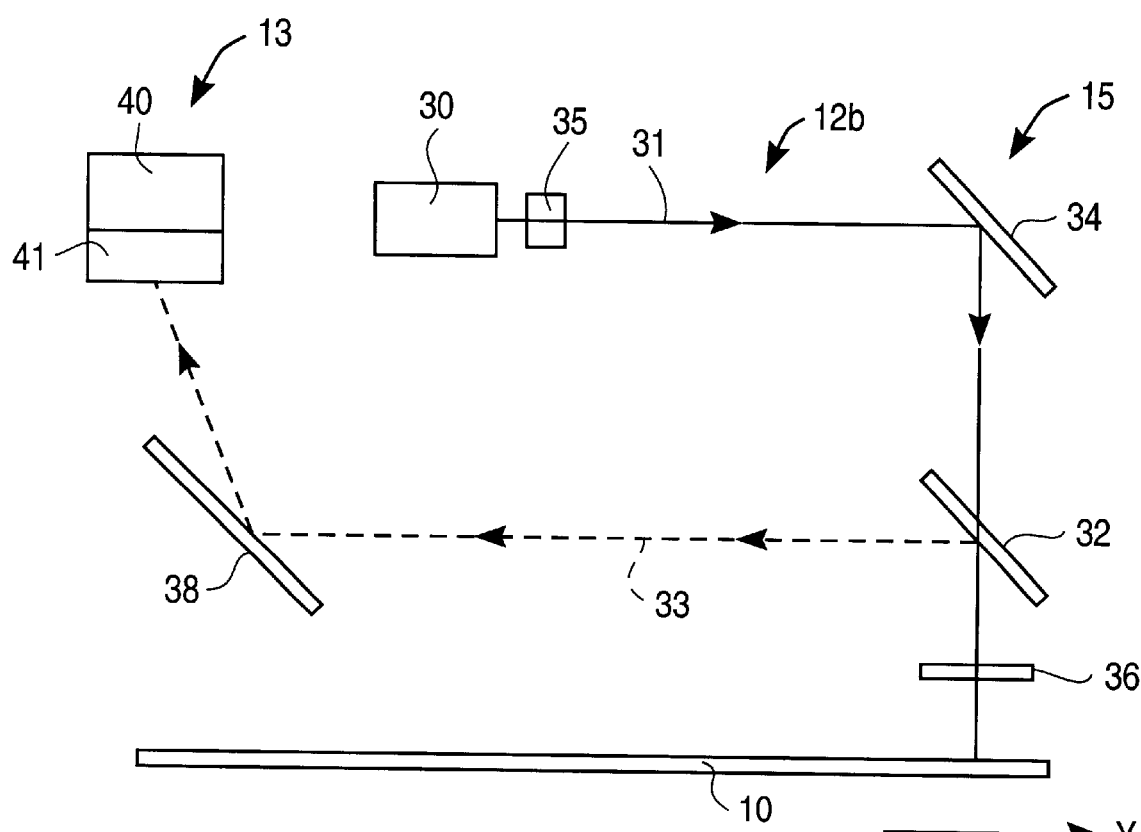
FIG. 4B is a schematic representation of an alternative preferred optical train.
Figure 4C:
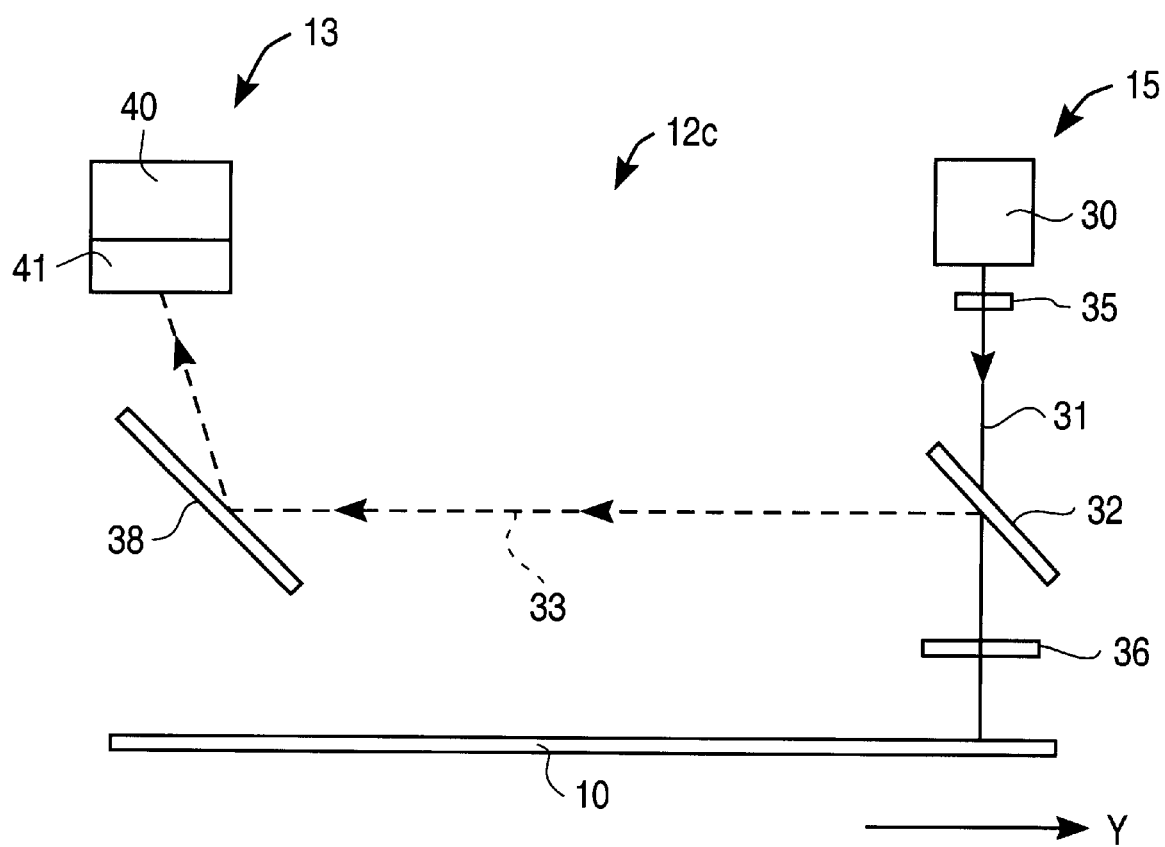
FIG. 4C is a schematic representation of yet another preferred optical train.
Figure 4D:
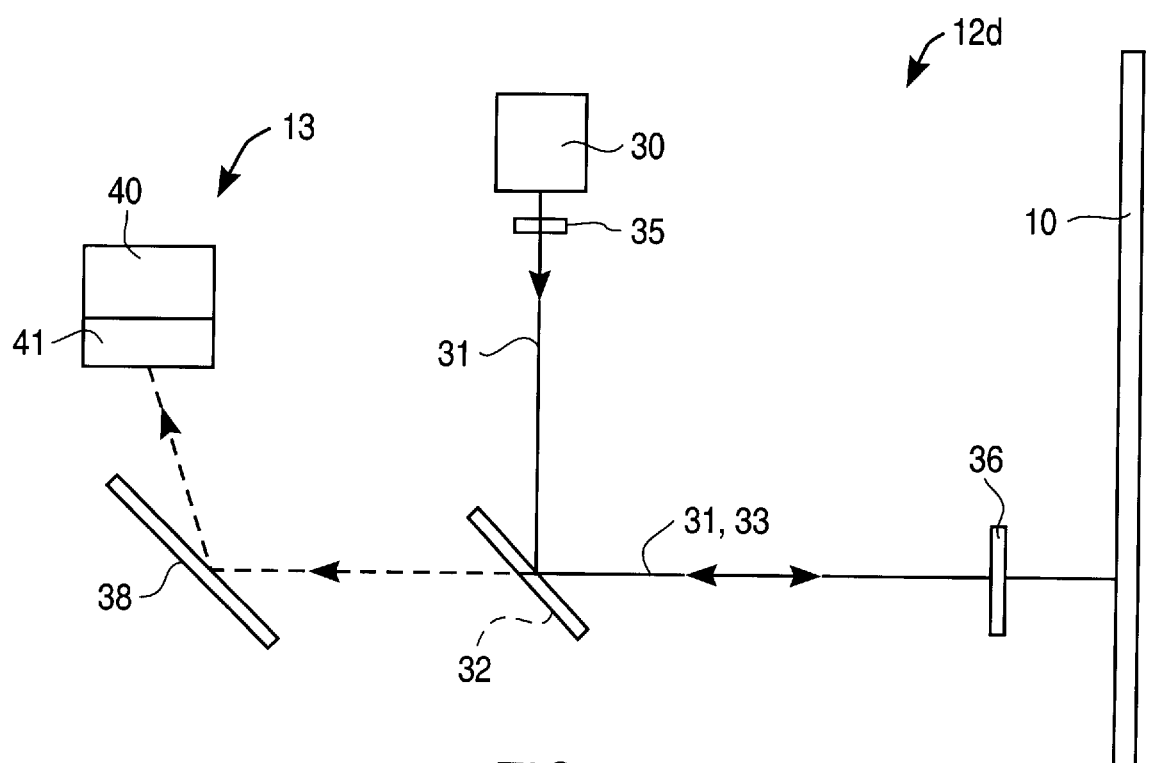
FIG. 4D is a schematic representation of an alternative preferred optical train.
Figure 4E:
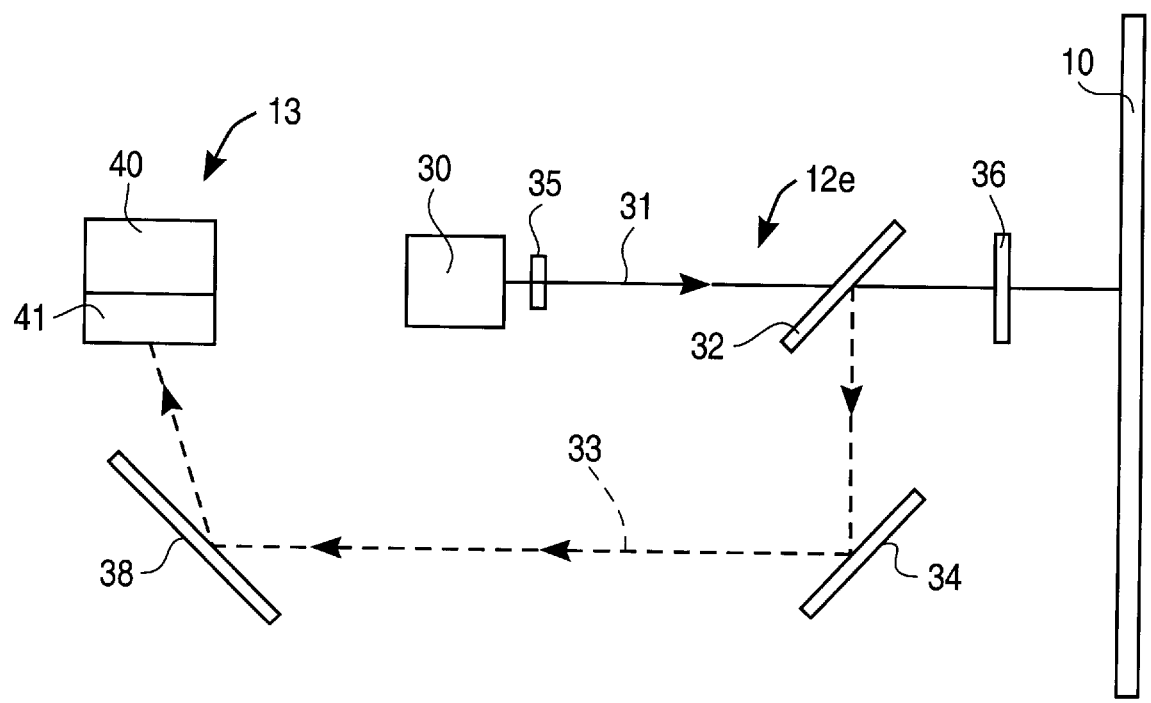
FIG. 4E is a schematic representation of yet another preferred optical train.

In the embodiments shown in FIGS. 3 through 4E, each optical train preferably comprises its own laser source 30 such that each scanning head 22, 24 and 26 has its own dedicated laser. By activating each of the three lasers in sequence, each of scanning heads 22, 24 and 26 will sequentially direct laser light onto the surface of phosphor screen 10 while collecting response radiation emitted from phosphor screen 10. By activating each scanning head in sequence, such that only one scanning head is active at a time, or by providing mechanical shielding such that the laser beam in each scanning head reaches the phosphor screen one at a time in sequence, imaging data will be collected from only one scanning head at a time, thereby allowing a single photomultiplier tube to be used for data collection from each of the three optical trains, while preventing stray laser light from adding noise to the collected data signal. Although the present invention operates with one central photomultiplier tube or photodiode, as explained, the present invention also encompasses embodiments having a dedicated photomultiplier tube or photodiode used for each optical train.

In the three head design shown in FIGS. 1A to 4C, 5 and 12 to 14, each scanning head 22, 24 and 26 will sequentially pass over the surface of phosphor screen 10 in an arcuate path. By advancing the phosphor screen relative to the rotating scanning device, a curved raster scan is generated, which can later be converted from polar coordinates into Cartesian coordinates.

The ratio of optical radius r, (shown in FIG. 1A as the distance from center 13 of scanning device 20 to the focal point of the laser beam under scanning head 22), to one-half the width of the phosphor screen is preferably selected such that the focussed laser beam under each scanning head (22, 24 or 26) passes completely across the entire width of phosphor screen 10 one after another, before a subsequent scanning head passes over the phosphor screen. In a preferred aspect, scanning heads 22, 24 and 26 are operated in sequence, such that only one scanning head is actively scanning across the phosphor screen at a time. For example, the laser in scanning head 22's optical train is turned on during the interval of time during which scanning head 22 moves across the phosphor screen from its position as shown in FIG. 1A to the position presently occupied by scanning head 26 in FIG. 1A. During the interval of time in which scanning head 22 moves across the surface of screen 10, the laser in each of scanning head 24 and 26's optical train will turned off. After scanning head 22 reaches the position presently occupied by scanning head 26, scanning head 22's laser will be turned off and scanning head 24's laser will be turned on.

Alternatively, the lasers in all three optical trains can be continuously operating, with mechanical shielding 11 (positioned between phosphor screen 10 and scanner 20 as shown in FIG. 1A), ensuring that the laser beam in each scanning head reaches the phosphor screen one at a time in sequence. Specifically, mechanical shielding can be provided such that the laser beam from any scanning head only reaches screen 10 when the scanning head is passing between the positions occupied by scanning heads 22 and 26 in FIG. 1A. Accordingly, as scanning head 22 moves across screen 10 (to the position presently occupied by scanning head 26), the laser beams emitted from scanning heads 24 and 26 will be blocked from reaching screen 10.

Each of the various scanning heads 22, 24 and 26 will preferably have the same optical radius. Specifically, the optical radius r between center 13 to the focal point of the laser beam under scanning head 22 will equal the optical radius between center 13 and the focal points of laser beams under scanning heads 24 and 26.

Optionally, the ratio of the optical radius relative to the phosphor screen width can also be selected such that a very short time gap occurs between the data collection of each subsequent scanning head. Such a short time gap facilitates image data processing as it makes it easier to distinguish between data collected by each of the various scanning heads 22, 24 or 26 and provides time for initialization of the data acquisition system.

Figure 12:
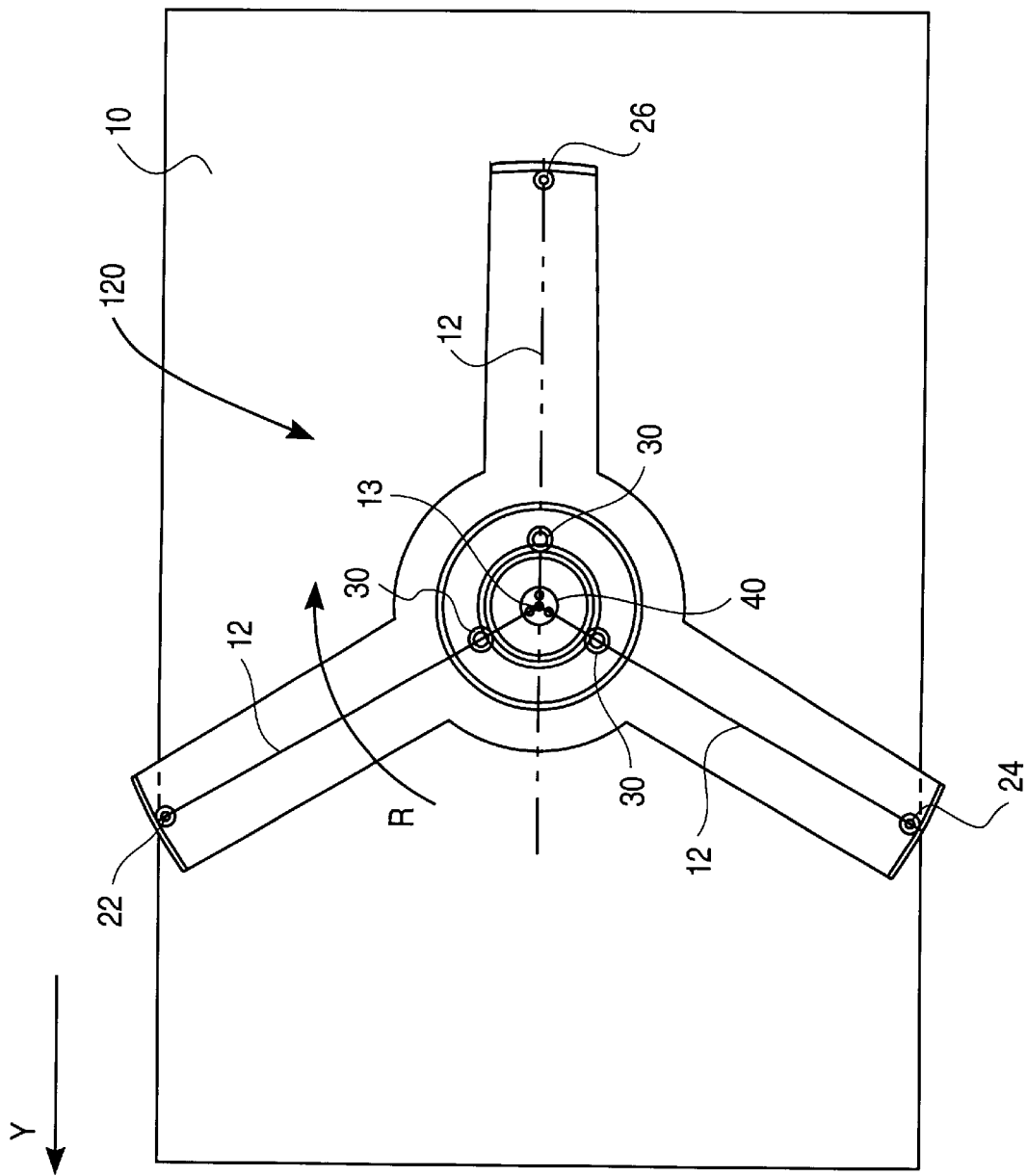
FIG. 12 is a top plan view of another preferred embodiment of the present invention incorporating three radially extending optical trains mounted at 120° to one another.

As is shown in FIGS. 1A and 1B, scanning device 20 may comprise a disc, however, as is shown in FIG. 12, the rotatable frame of the scanning device may instead comprise a Y-shaped frame 120 having three radially extending arms connected together at the center of the frame.

Figure 9:
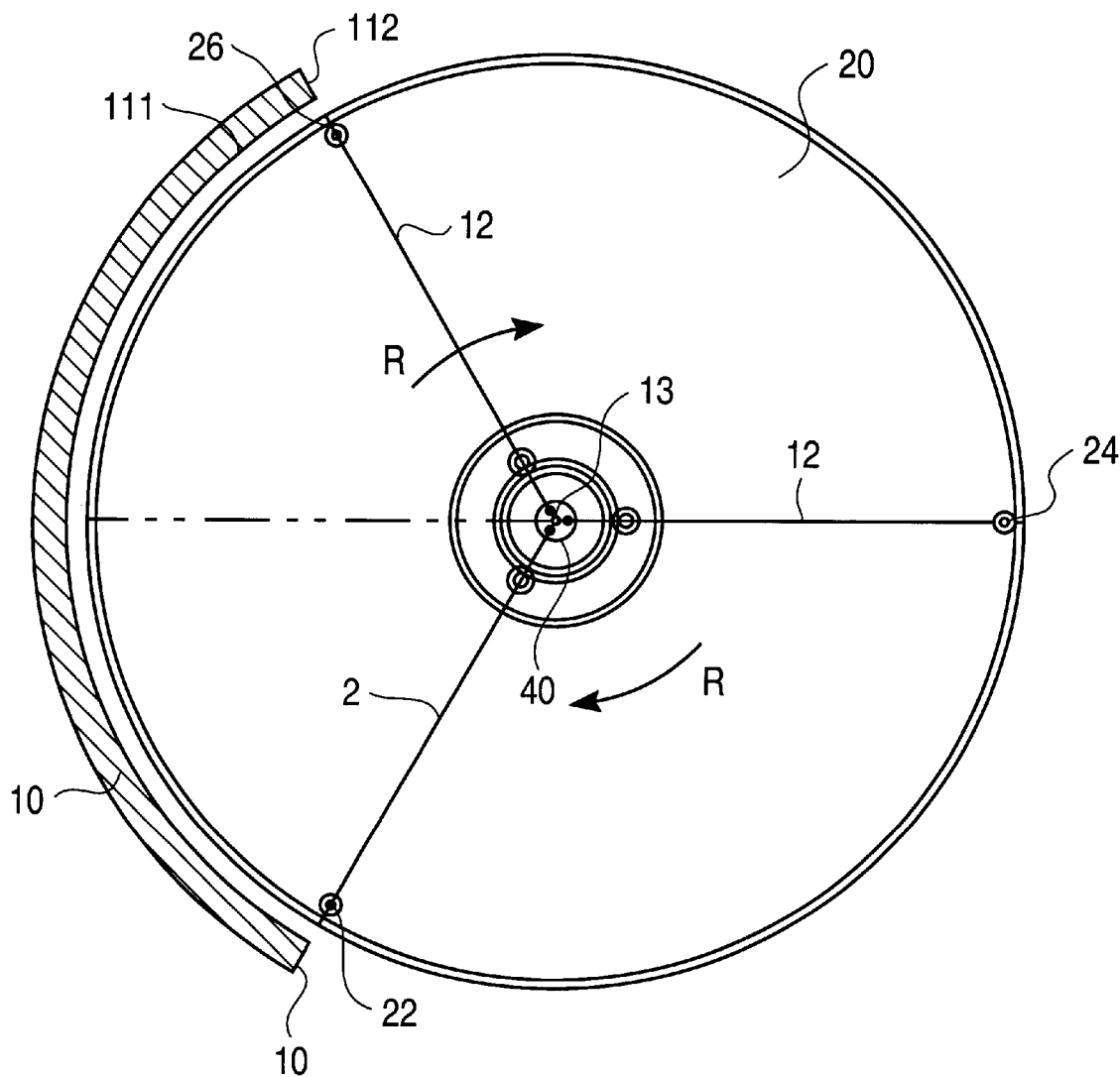
FIG. 9 is a top plan view of an alternate arrangement of the present invention with the phosphor screen disposed perpendicular to the scanning device and partially wrapped around the perimeter of the scanning device.
Figure 10:
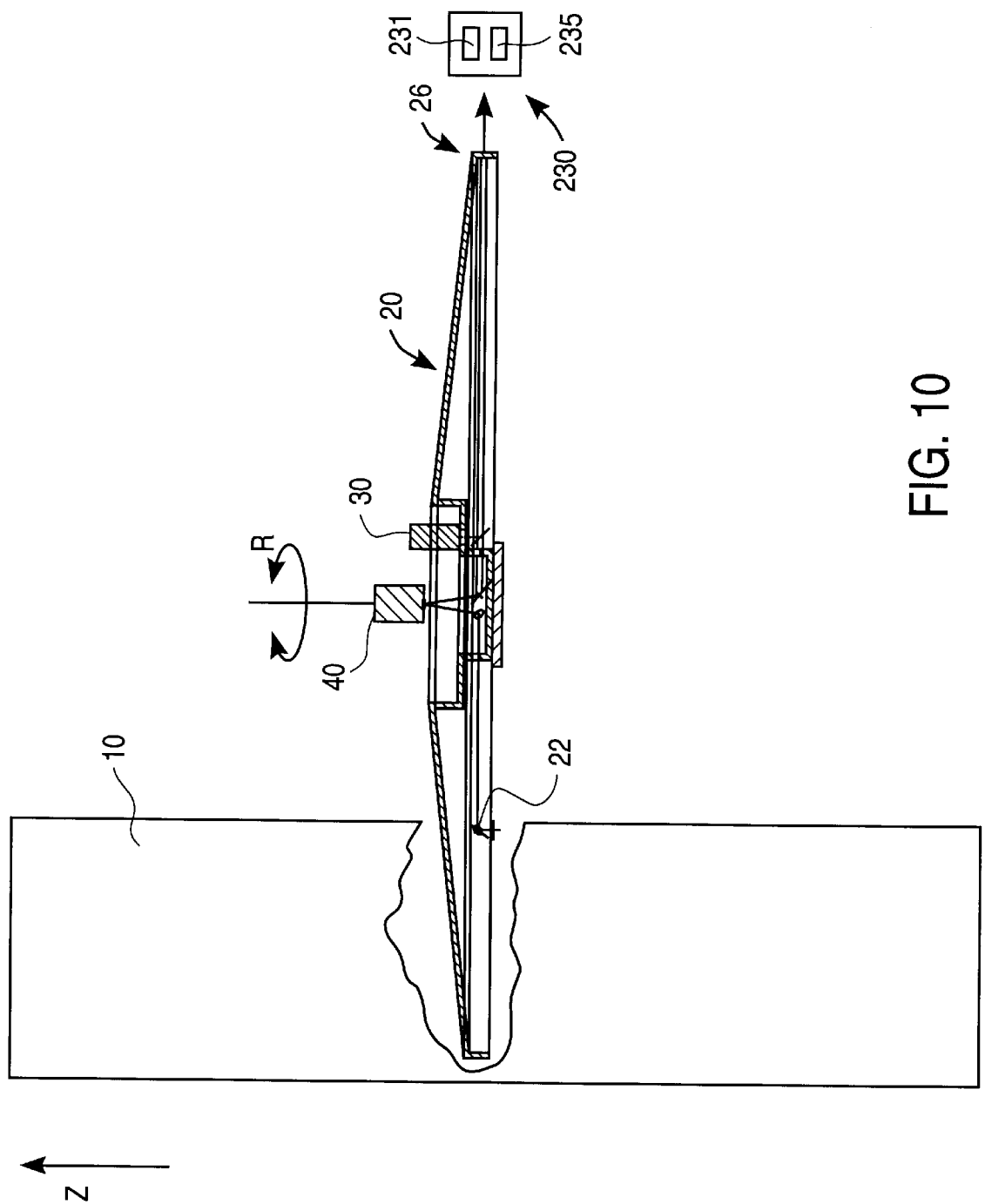
FIG. 10 is a cut away side view corresponding to FIG. 9.
Figure 11:
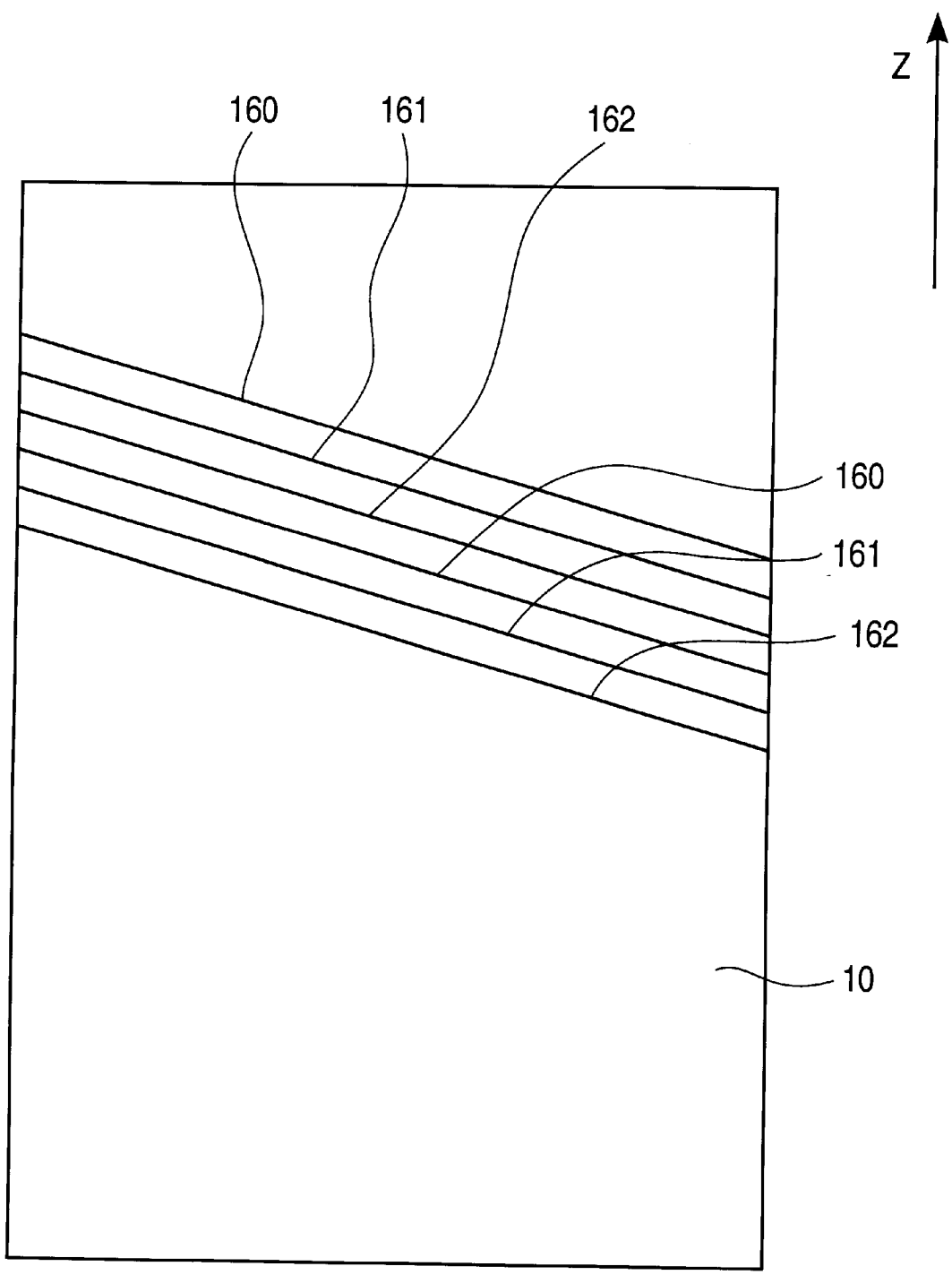
FIG. 11 is an illustration of successive scans taken across the phosphor screen of FIG. 9.

In a second embodiment, the present invention encompasses a rotating scanning head positioned with a phosphor screen wrapped partially therearound as is shown in FIGS. 9 to 11, employing the optical trains as shown in FIGS. 4D and 4E. As is seen in FIGS. 9 and 10, phosphor screen 10 is oriented perpendicular to scanning device 20, with phosphor screen 10 wrapped partially around scanning device 20. As seen in FIG. 10, scanning device 20 rotates in direction R with screen 10 advanced in direction Z, being perpendicular to the plane of rotation of scanning device 20. It is to be understood that such relative motion can alternatively be achieved by holding curved phosphor screen 20 at a fixed position and moving scanning device 20 in the Z direction, rotating scanning device 20 at a fixed Z location and moving phosphor screen 20 in the Z direction, or some combination thereof.

As can be seen in FIG. 9, when using a three head scanner, phosphor screen 10 is preferably wrapped to extend 120 degrees around scanning device 20, such that it spans the arcuate distance between successive scanning heads 22 and 26 as shown. Similarly, when instead using a two head scanner having optical trains spaced 180° apart, phosphor screen 10 is preferably wrapped to extend 180° around scanning device; and similarly, when using a four head scanner, phosphor screen 10 is preferably wrapped to extend 90° around scanning device to ensure that only one scanning head is passing over the surface of the phosphor screen at a time.

Using this arrangement, (as illustrated for a three head scanner in FIG. 9, scanning head 26 will just complete its scan across phosphor screen 10 as scanning head 22 moves into position to scan across phosphor screen 10. An advantage of this embodiment can be seen in FIG. 11 which shows successive scan lines 160, 161 and 162 taken across screen 10 by sequential scanning heads 22, 24 and 26 respectively. As can be seen, scan lines 160, 161 and 162 taken across phosphor screen 10 are quite straight, being deflected by the amount of movement in the Z direction between successive scanning heads 22, 24 and 26 moving across the phosphor screen. (The actual separation distance between successive scan lines 160, 161 and 162 has been exaggerated for illustration purposes).

As can be seen in FIG. 9, should scanning device 20 be dimensioned such that screen 10 does not span all of the distance between successive scan heads, (for example, should screen 10 reach only between points 110 and 111), a gap time will be created between successive scans during the interval of time in which no scanning head is passing over the phosphor screen, (in particular, during the interval of time a scanning head is passing from points 111 to 112).

The Preferred Optical Trains

The optical trains shown in FIGS. 3 to 4C are preferably for use with the embodiment of the present invention shown in FIGS. 1A to 2, 5 and 12 to 14. and the optical trains shown in FIGS. 4D and 4E are preferably for use with the embodiment of the present invention shown in FIGS. 9 to 11., as will be explained.

Referring to the first embodiment, FIG. 3 shows a sectional schematic view of a first optical train comprising a laser 30, dichroic mirror 32, reflecting mirror 34, focussing/collimating lens 36, steering mirror 38, and photomultiplier tube 40. In accordance with this embodiment of the invention, laser 30 emits a collimated beam 31 of laser light which is reflected by dichroic mirror 32 towards reflecting mirror 34 and is further reflected downwardly through lens 36 which focuses beam 31 on phosphor screen 10. A response radiation 33 emitted by phosphor screen 10 will travel upwardly through lens 36 which collimates beam 33 and is then reflected by reflecting mirror 34 along with the same optical path as beam 31. When beam 33 reaches dichroic mirror 32, it will pass therethrough eventually reaching steering mirror 38 which reflects beam 33 into photomultiplier tube 40. Optionally, a second focussing lens 37 can be positioned between dichroic mirror 32 and steering mirror 38. The output of photomultiplier tube 40 over time will correspond to the emitted intensity of emissions along an arcuate scan line across phosphor screen 10. For comparison, FIG. 4A illustrates a schematic of the optical train 12a layout as seen in FIG. 3.

Scanning head 26 comprises those components located at the radially outward end of the optical train. In this embodiment, scanning head 26 comprises reflecting mirror 34 and focussing lens 36. An advantage of this embodiment is that laser 30 and dichroic mirror 32 can be mounted at an inward location proximal the center of the scanning device. Accordingly, a minimal number of system components are disposed at scanning head 26, and thus, the torque required for rotating scanning device 20 at high-speeds is reduced.

Alternative preferred designs for the optical train are possible. For example, FIG. 4B shows optical train 12b comprising laser 30 emitting beam 31 radially outward to reflecting mirror 34 which reflects beam 31 through dichroic mirror 32 and focussing lens 36 towards phosphor screen 10. Response radiation emitted by phosphor screen 10 as beam 33 will be reflected by dichroic mirror 32 radially inwardly to steering mirror 38 which in turn reflects beam 33 to photomultiplier tube 40. In this embodiment, scanning head 26 comprises reflecting mirror 34, dichroic mirror 32 and focussing lens 36.

In another preferred aspect, optical train 12c, (shown in FIG. 4C), comprises laser 30 which emits beam 31 directly downwardly onto phosphor screen 10. Beam 33 will be reflected by dichroic mirror 32 towards steering mirror 38 which in turn reflects beam 33 into photomultiplier tube 40. In this embodiment, scanning head 26 comprises laser 30, dichroic mirror 32 and focussing lens 36. An advantage of this embodiment of the optical train is that a reflecting mirror, (such as mirror 34)., is not required.

Optionally, in any of the above preferred aspects of the optical train, a filter 41, which may comprise a red light blocking filter, may be included, and is preferably positioned between steering mirror 38 and photomultiplier tube 40, as shown in FIGS. 4A to 4E. Filter 41 will preferably permit blue wavelength emitted response radiation beam 33 to pass therethrough, yet prohibit the passage of reflected or scattered red wavelength incident laser therethrough. Optionally as well, a collimating lens 35 can be positioned adjacent laser 30 for producing a collimated laser beam, as shown in FIGS. 4A to 4E.

An important advantage common to all the above described optical trains 12a, 12b, 12c, 12d and 12e is the absence of moving parts since the relative movement of each of the scanning heads 22, 24 and 26 over phosphor screen 10 is accomplished by rotating scanning device 20 about center 13 and moving phosphor screen 10, (or moving scanning device 20), in direction Y by a transport mechanism. Accordingly, the present invention avoids problems of accurately controlling the position of a scanning head which is constantly changing speed while moving back and forth in one or more directions.

In the alternative embodiment shown in FIGS. 9 to 11, optical trains 12d or 12e (FIGS. 4D and 4E) are used. In both optical trains 12d and 12e, the laser beam 31 is directed radially outwardly through focussing lens 36 to phosphor screen 10. In contrast, in optical trains 12a to 12b, (FIGS. 4A to 4B), a reflecting mirror 34, is used to reflect the laser beam 31 downwardly 90° toward phosphor screen 10.

Using any of the various above described embodiments of the optical train, the laser light beam 31 emitted from laser 30 may preferably have a wavelength of about 635 to 680 nM and a power in the range of 0 to 30 mW. Response radiation beam 33 will typically have a wavelength centered at about 390 nM. Focussing/collimating lens 36 may comprise a 5 to 15 mm diameter lens with a focal length of 4 to 10 mm which will focus the collimated beam 31 of laser light into a beam width of about 25 to 250 microns, and most preferably 30 to 80 microns on the surface of phosphor screen 10. Minimizing the diameter of the incident laser light beam upon the phosphor screen will minimize destructive pre-reading of the image data caused by forward overlap of the focused beam and reflected and scattered laser light. It is to be understood that the foregoing wavelengths, powers and sizes are merely exemplary and that other wavelengths, powers and sizes may also be used.

The Use of Different Numbers of Equally Spaced Apart Scanning Heads

The present invention encompasses designs with two, three, four or more scanning heads. The advantages of each of these various designs will be described below.

Using a laser beam excitation system to read an image trapped in a phosphor screen is a "one-time" operation since the actual reading of the stored image by the laser beam will operate to release the image. It is therefore not possible to scan the same pixel of the phosphor screen again and again.

Figure 5:
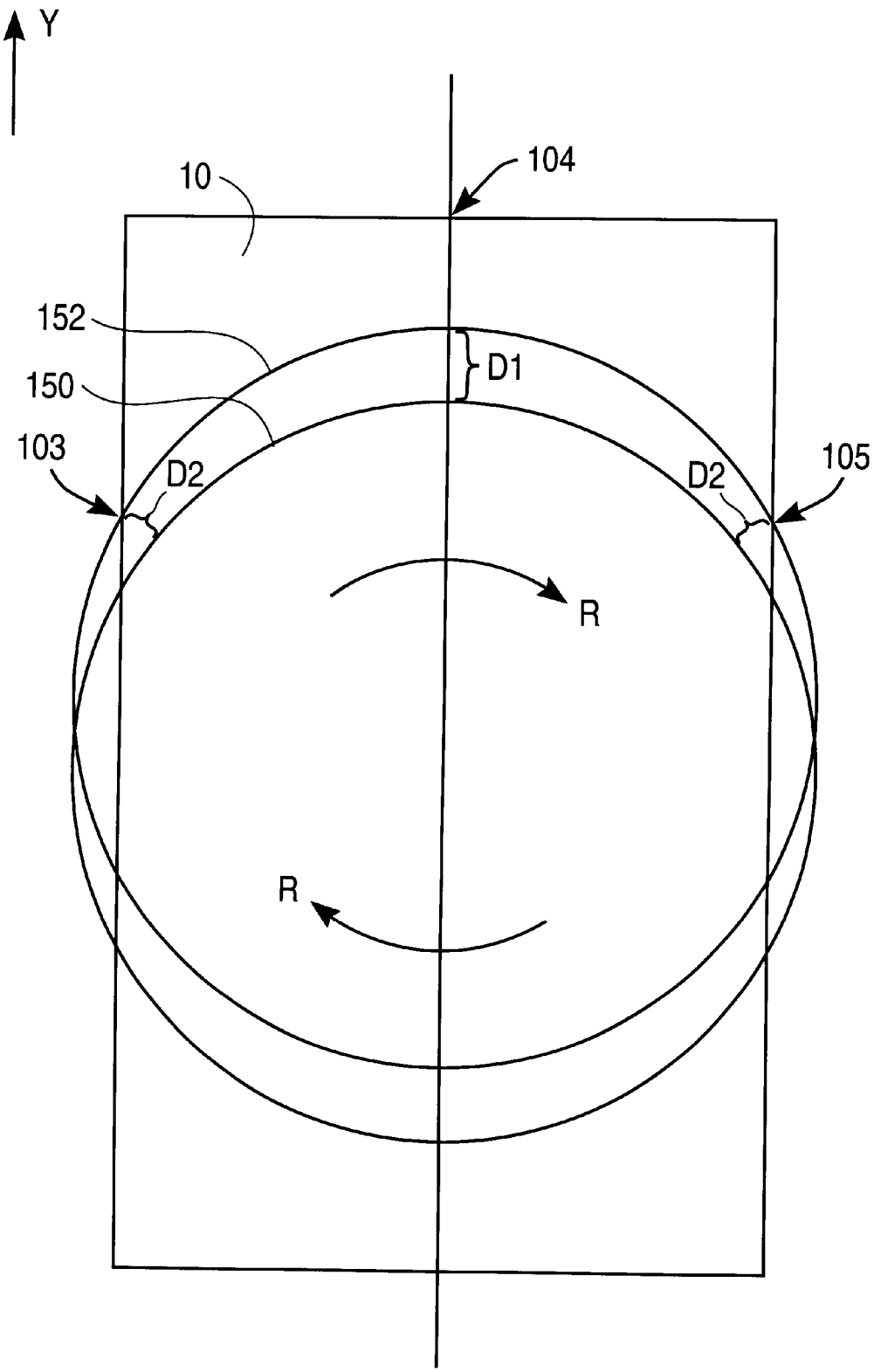
FIG. 5 is a geometric representation of incremental movement of an arcuate line across the surface of a phosphor screen.

FIG. 5 is an geometric representation of successive scan lines taken by the rotating scanning device 20 of FIG.1A (not shown) above phosphor screen 10 as screen 10 is incrementally moved in the Y direction. (The actual separation distances between scan lines 150 and 152 are exaggerated in FIG. 5 for illustration purposes.) As the scanning device is rotated, a first arcuate scan line 150 will be taken by a first scanning head passing across the surface of phosphor screen 10 from edge 103 to edge 105. Coincident to the first scanning head reaching edge 105, phosphor screen 10 will have advanced in direction Y by distance D1. Accordingly, a second scan line 152 will then be taken across phosphor screen 10 by a second scanning head passing from edge 103 to 105.

As can be seen, distance Dr. is the distance separating scan lines 150 and 152 at center location 104. Distance D2 is the distance separating scan lines 150 and 152 at edge 105, (and also edge 103), as shown. (In particular, distance D2 is measured as the perpendicular distance between lines tangential to scan lines 150 and 152 at edges 105 and 103.) As can be seen, distance D2 is smaller than distance Dr. since the separation spacing between lines 150 and 152 will progressively narrow towards the edges of the phosphor screen.

To avoid destructive reading caused by scanning the same pixel in the phosphor screen more than once, it is therefore important that the separation distance D2 between successive scan lines 150 and 152 does not become too small, and in particular does not become much smaller than the focussed laser beam spot diameter. Should the separation distance D2 become somewhat smaller than the focussed laser beam spot diameter, successive scanning heads will tend to pass over the same pixels at the edges of the phosphor screen, resulting in destructive reading. Accordingly, it is therefore desirable to maintain a sufficient distance D2, which will be defined in part by the diameter of the focussed laser beam. As can be appreciated, the straightness of scan lines 150 and 152 is determined by the ratio of the scanning device optical diameter to phosphor screen width, with straighter scan lines occurring as the ratio of the scanning device optical diameter to phosphor screen width is increased. The larger the spacing of D2 becomes at the edges of the phosphor screen, the less potential for destructive reading at the edges of the phosphor screen.

Figure 6A:
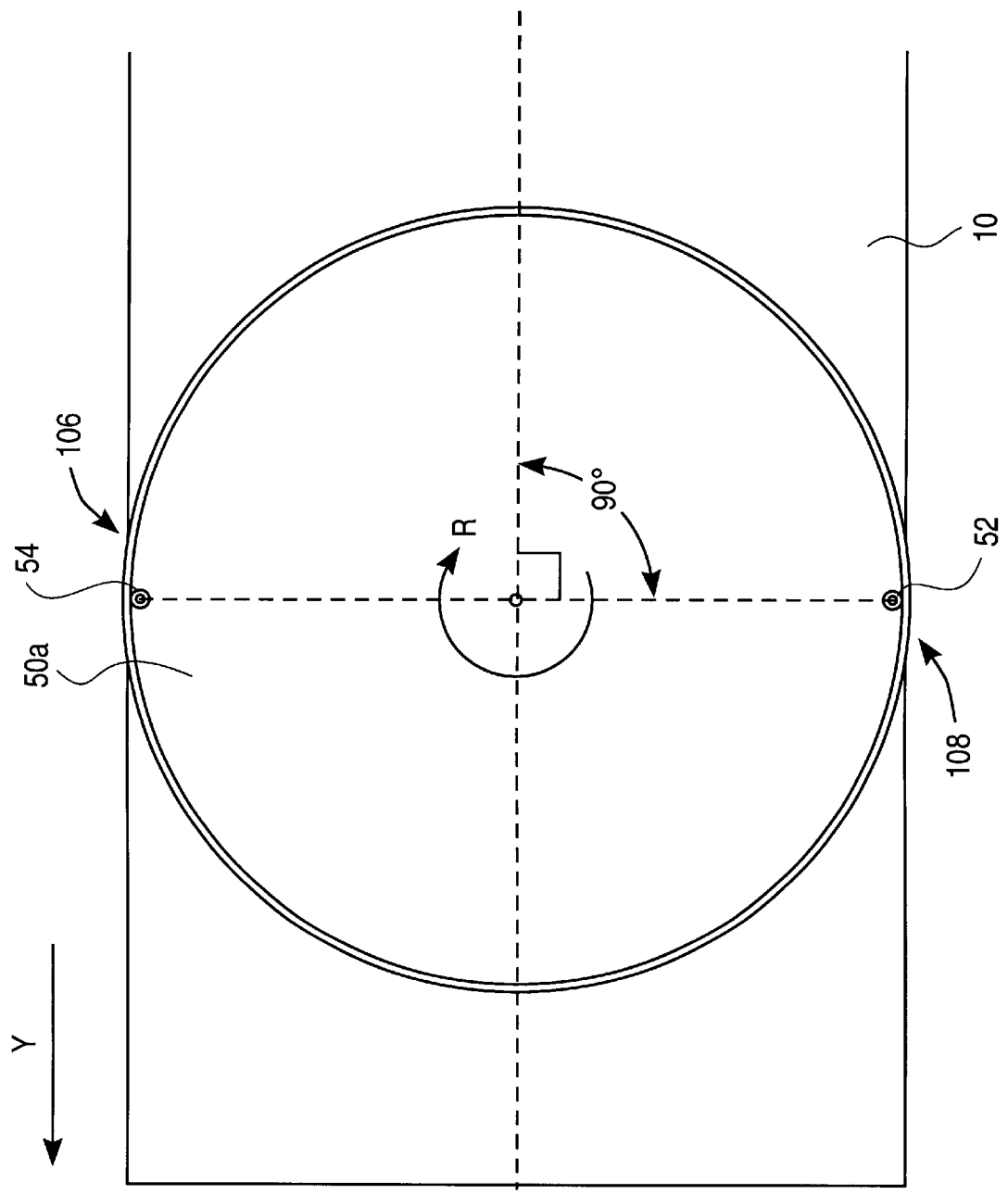
FIGS. 6A and 6B show a two head scanning device.

FIG. 6A shows a two head scanning device 50a having scanning heads 52 and 54. Scanning device 50a is dimensioned such that the separation distance between scanning heads 52 and 54 is equal to the width of phosphor screen 10. As scanning device 50a is rotated in direction R, each of scanning heads 52 and 54 will sequentially trace an arcuate semi-circular path across the surface of phosphor screen 10 from edge 108 to edge 106. Scanning heads 52 and 54 are always positioned over the phosphor screen, however, scanning heads 52 and 54 are activated one at a time such that after scanning head 52 has scanned across the phosphor screen from side 108 to 106, (and is then turned off), scanning head 54 will have moved into the position currently occupied by scanning head 52 such that scanning head 54 can be turned on to similarly scan across the phosphor screen from edge 108 to 106.

A major limitation of the system of FIG. 6A is the fact that the reading of the image stored in screen 10 will result in destructive reading of image data proximal the edges of the screen 10 since scanning heads 52 and 54 will tend to pass over the same pixels one after another at screen edges 106 and 108. Specifically, should an attempt be made to acquire a pixel by pixel scan of the phosphor screen using the system as dimensioned in FIG. 6A, it is difficult to generate meaningful data toward screen edges 106 and 108, due to the fact that data sampling will essentially comprise oversampling the same pixels with each scan, thereby attempting to re-read pixels from which the stored image has already been released.

As was stated, it would be desirable to have the sequential scan lines passing across the surface of the phosphor screen being as straight as possible, such that adequate separation is maintained between these scan lines at the edges of the screen, (such that individual pixels are not sampled more than once).

Figure 6B:
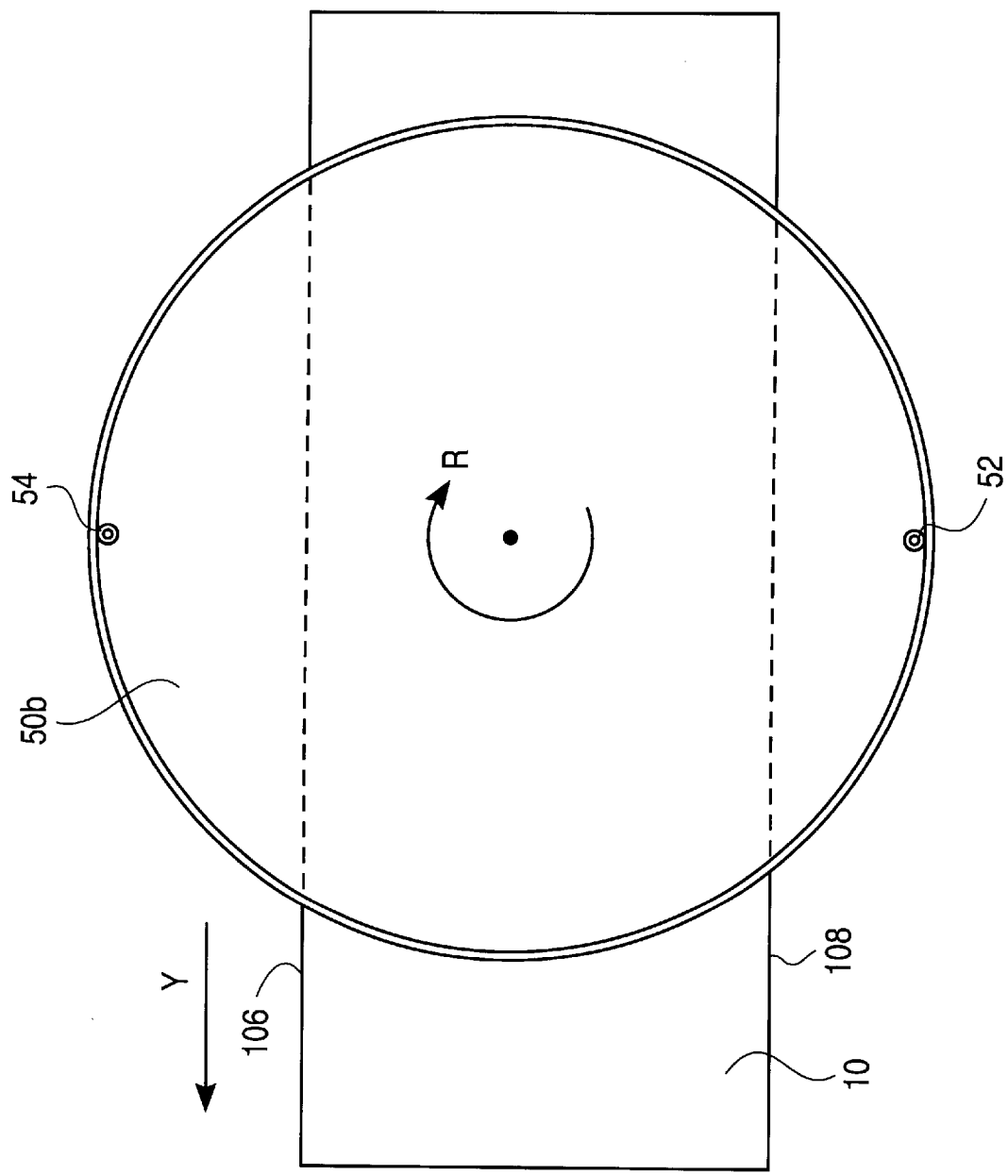

In the embodiment of the present invention shown in FIG. 6B, the two head scanning device is instead dimensioned with a larger diameter to screen width ratio than as illustrated in FIG. 6A. As such, straighter scan lines, (having greater separation distance therebetween at the edges 108 and 106 of phosphor screen 10), will be generated. However, time gaps will occur between the data sampled by the scanning heads, due to the fact that both scanning heads 52 and 54 will be positioned off the surface of the phosphor screen for some time during each revolution of the scanning device. This problem can be addressed by increasing the rotational speed of the scanner, such that screen 10 can still be scanned in a relatively short period of time. An advantage of the two head scanning system is that only two optical trains need to be built, making the device easier to manufacture and reducing the weight of the system.

In an alternate embodiment of the invention as shown in FIG. 1A, a three head scanning device is used. The selection of three heads spaced 120 degrees apart coupled to a single central photodetector as shown has a number of advantages. As will be explained, when the optical radius at 1.1547 times one-half the width W10 of screen 10, 100% read efficiency can be achieved with successive scanning heads moving across the screen one after another with no duty cycle time lost between successive scanning heads. In particular, a first scanning head will just complete its scan across the screen (and begin to move off the surface of the screen), at the same time that a second scanning head will just commence its scan across the screen (and begin to move onto the surface of the screen). Further advantages of the three head scanning system is that it has a minimal number of separate optical trains, a reasonably small scanning device diameter, at the same time providing sufficiently straight scan path across the surface of the phosphor screen such that sequential scan lines are sufficiently separated at the edges of the phosphor screen such that the diameter of the focussed laser beam does not result in destructive pre-reading.

Figure 7:
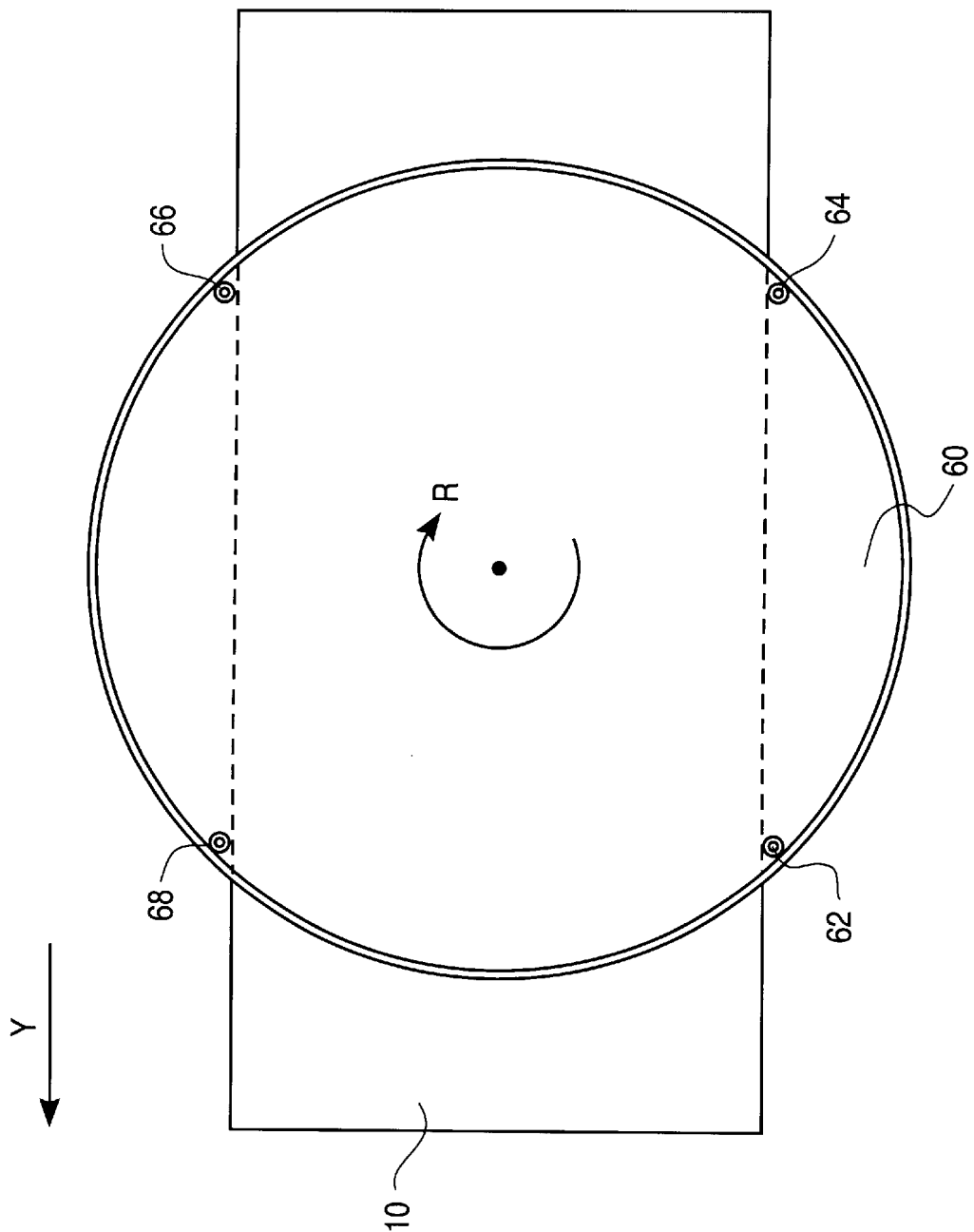
FIG. 7 shows a four head scanning device.

FIG. 7 shows a four head scanning device 60, having four scanning heads 62, 64, 66 and 68 which are equally spaced at 90° to one another. Scanning device 60 is dimensioned to have a diameter greater than the width of screen 10, as shown, such that sufficiently straight scan lines can be taken as scanning head 62 moves to the position presently occupied by scanning head 68. An advantage of the four head scanner of FIG. 7 is that the system can be dimensioned with the ratio of scanner diameter to screen width set such that successive scan heads move into position and commence scanning across the screen at the moment in time when the preceding scanning head stops scanning as it passes off the surface of the phosphor screen, as shown.

Figure 8:
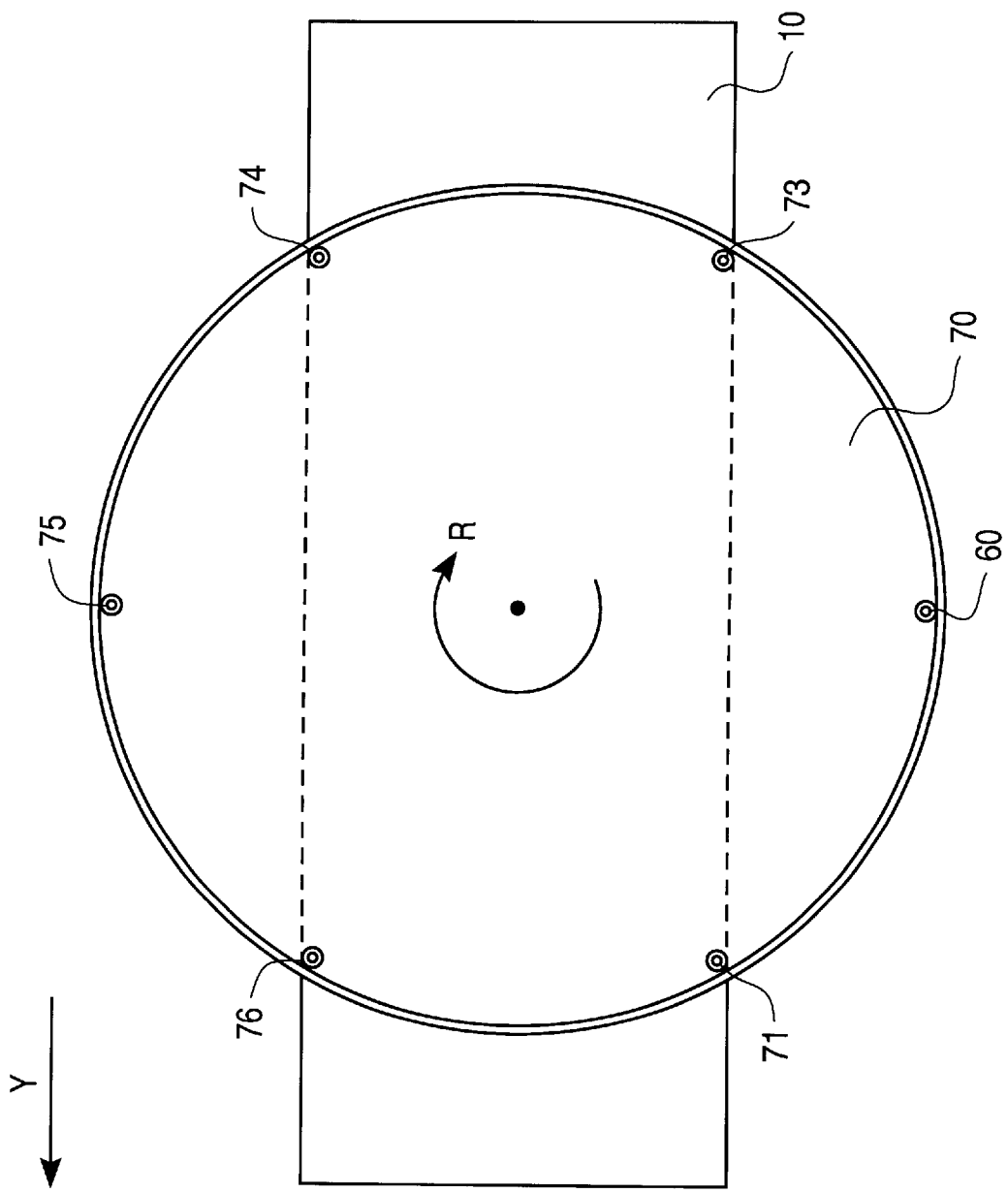
FIG. 8 shows a six head scanning device.

As can be appreciated, it is possible to add additional numbers of scanning heads. For example, a six head scanning device 70, having six equally spaced apart scanning heads 71, 72, 73, 74, 75, and 76 is shown in FIG. 8. By increasing the optical diameter of the rotary scanning device relative to the width of the phosphor screen, the scan lines are progressively straightened. By adding additional numbers of scanning heads, the advantage of avoiding gaps in data collection is achieved.

Relationship of the Distance from the Center of Each Scanning Head Relative to the Phosphor Screen Width for the Three Head Scanning System Returning to the three head system of FIG. 1A, as scanning device 20 is rotated in direction R, scanning heads 22, 24, and 26 will sequentially pass over phosphor screen 10 in generally arcuate paths as has been described. Using the dimensions depicted in FIG. 1A, the optical radius will be 1.1547 times one-half the width W10 of screen 10. The 1.1547 ratio is calculated as follows. Referring to FIG. 1A, the optical radius, (ie: the radial distance "r" from center 13 to the focussed laser beam spot on phosphor screen 10 under scanning head 22), will be 1/SIN (60°) times ½ W10. Accordingly, the optical diameter of scanning device 20, (which is double the optical radius "r",), will have the same ratio as compared to W10, (which is double ½ W10).

Such a preferred optical diameter to phosphor screen width ratio of 1.1547 can be achieved by using a standard 14 inch width (17 inch length) screen 10 and fabricating scanning device 20 to have an optical diameter of 16.166 inches. It is to be understood, however, that the three head scanning device of the present invention could be dimensioned to work with other standard phosphor screen sizes, including a 11.547 inch optical diameter scanning device for 10 inch wide by 12 inch long screens and a 9.238 inch optical diameter scanning device for 8 inch wide by 10 inch long screens, thereby maintaining the preferred optical diameter to width ratio of 1.1547.

Having a preferred scanning device optical diameter to screen width ratio of 1.1547, as scanning device 20 is rotated in direction R, scanning head 22 is activated and will commence scanning across the surface of phosphor screen 10 in an arcuate path until it reaches the position presently shown as occupied by scanning head 26. As scanning head 22 moves off the surface of the phosphor screen, scanning head 24 will be activated as it reaches the position presently shown as occupied by scanning head 22. As can be appreciated, when each of the three scanning heads is sequentially activated as it passes over the surface of phosphor screen 10, image data can be continuously collected, thereby achieving a 100% read efficiency (ie: 100% duty cycle).

Figure 14:
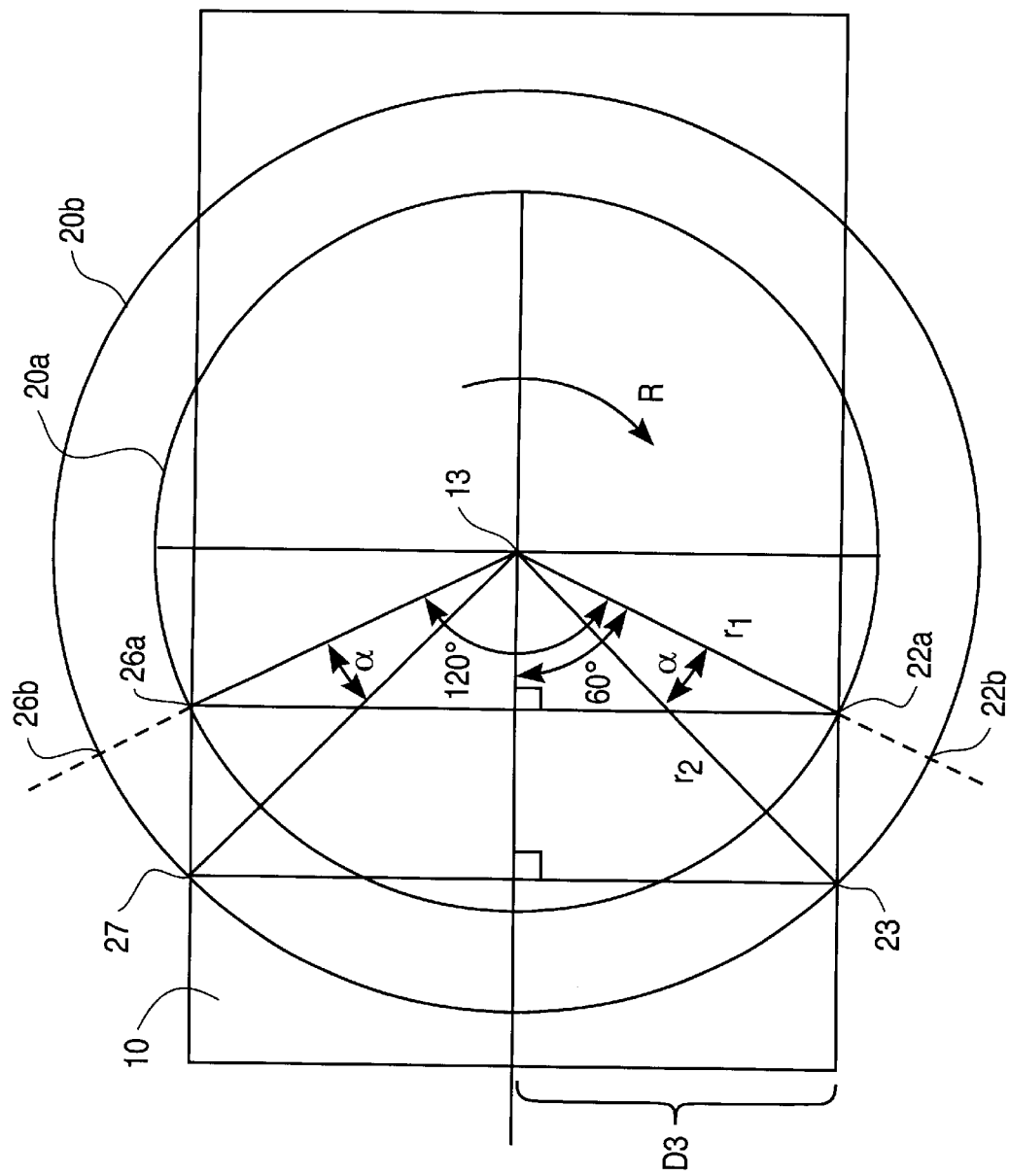
FIG. 14 is a geometric representation of two scanning devices having different optical diameters positioned over the center of a phosphor screen, showing "gap time".

In another aspect of the invention, as shown in FIGS. 1B and 14, the optical diameter of scanning device 20 is more than 1.1547 times the width W10a of phosphor screen 10a. In this embodiment, a short gap of time is provided between the data sampling of each of the three scanning heads, as follows. As scanning device 20 is rotated in direction R, scanning head 22 will commence scanning in an arcuate path across the surface of phosphor screen 10 at the time when it first reaches position 23. In the interval of time during which scanning head 22 moves to position 23, the data acquisition system for scanning head 22 can be initialized. During the interval of time in which scanning head 22 is moving to position 23, scanning head 26 is moved off the surface of screen 10, and no imaging data will therefore be collected. Such a short interval of time between the operation of successive scanning heads permits one scanning head (eg: scanning head 26) to be shut down while a successive scanning head (eg: scanning head 22) to be activated.

The relationship between the selected scanning device optical diameter to phosphor screen width and its corresponding "gap time" is seen in FIG. 14, which shows two different scanning devices 20a and 20b, having different optical diameters as shown, with scanning devices 20a and 20b centered over phosphor screen 10. Scanning device 20a has an optical diameter to screen width ratio of 1.1547 (as described herein and as illustrated, for example, in FIG. 1A), such that as scanning head 26a passes beyond one edge of the phosphor screen, scanning head 22 is exactly moving into position over the opposite edge of the phosphor screen. Scanning device 20b has an optical diameter to screen width ratio greater than 1.1547, (as described herein and as illustrated, for example, in FIG. 1B). Having such an optical diameter to width ratio, a "gap time" will occur during each duty cycle, (defined herein as 120° of rotation), as each successive scanning head passes through angles ALPHA between points 22b and 23 and between points 27 and 26b.

Scanning Head Alignment

It is important that each of the various scanning heads 22, 24 and 26 are precisely positioned to be equidistant from the center 13 of scanning device 20, such that each of the scanning heads pass over the exact same path as the scanning device is rotated. Referring to the embodiment shown in FIG. 1A, , a bi-cell 130 can be mounted directly under scanning device 20 at a location in or near the plane of screen 10. Bi-cell 130 is comprised of a pair of light detectors 131 and 133, separated by a partition 135. As each of scanning heads 22, 24 and 26 is rotated over bi-cell 130, light detectors 131 and 133 will measure incident beam 31 as the scanning head passes over the bi-cell. By moving the radial position of each of the scanning heads passing over bi-cell 130, the incident beams from each of the scanning heads are preferably aligned such that beam 31 passes directly over partition 135 between light detectors 131 and 133, or alternatively, such that the beam 31 is measured in equal strength by light detectors 131 and 133, thereby indicating that beam 31 is passing directly between light detectors 131 and 133. Alternative radial distance position sensing systems are possible. For example, bi-cell 130 can optionally be replaced with a charge couple device (CCD) system.

Figure 13:
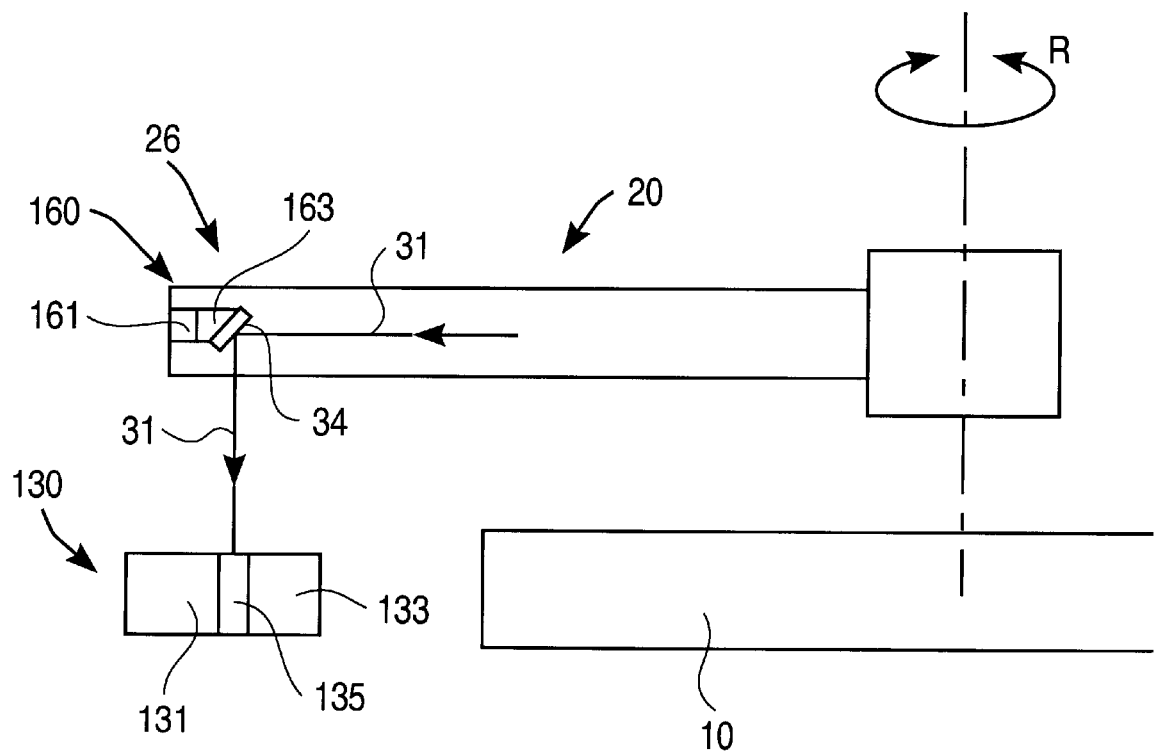
FIG. 13 shows a view taken along line 13—13 in FIG. 1A, (but having scanning head 26 rotated to a position over the bi-cell), showing a system for radially positioning a scanning head.

As is seen in FIG. 13, a positioning system 160 comprising a heating element 161 and a thermal expansion material 163 can be used for radially positioning individual scanning heads, (for example, scanning head 26), by moving mirror 34 radially. Specifically, the application of a current through heating element 161 will cause expansion of thermal expansion material 163, which in turn will cause the scanning head to be moved radially. By varying the current applied to heating element 161, it is therefore possible to move scanning head radially inwardly and outwardly. Alternatively, each of the scanning heads could be set manually inwardly and outwardly by set screws or other fasteners.

It is to be understood that in the various designs of the present invention, the radial positioning system used will preferably move all components of the optical system disposed adjacent the outer perimeter of the rotating scanning device. Accordingly, in various designs, the positioning system may move a reflecting mirror, a dichroic mirror and a laser source, as required.

In the system shown in FIGS. 9 and 10, proper alignment of the scanning heads in the Z direction can similarly be accomplished with a bi-cell 230, comprised of a pair of light detectors 231 and 233, separated by a partition 235, (operating the same way as was described with respect to bi-cell 130).

What is claimed is:

1. A three-head scanning device for reading an image stored on a photostimulable medium, comprising, a rotatable frame having a center and an outer perimeter;

at least one photomultiplier tube disposed at a location proximal the center of the rotatable frame;

three radially extending optical trains mounted to the rotatable frame at 120 degrees to one another, each optical train configured to direct incident laser light towards the photostimulable medium and to direct response radiation emitted by the photostimulable medium in response to the incident laser light towards the photomultiplier tube, each optical train comprising a laser.

2. The three-head scanning device of claim 1, wherein 1, the laser in each optical train is mounted to the rotatable frame at a location proximal the center of the rotatable frame, the laser emitting the incident laser light in a direction generally normal to a direction radially outwards from the center of the rotatable frame and wherein each optical train further comprises:

(i) a dichroic mirror mounted to the rotatable frame at a location adjacent the laser, the dichroic mirror positioned to reflect the incident laser light emitted by the laser in the direction radially outwards from the center of the rotatable frame;

(ii) a reflecting mirror mounted to the rotatable frame at a location proximal the outer perimeter of the rotatable frame, wherein the reflecting mirror is positioned to reflect the incident laser light in the direction generally normal to the direction radially outwards from the center of the rotatable frame;

(iii) a steering mirror mounted to the rotatable frame at a location adjacent the photomultiplier tube, the steering mirror being positioned to reflect the response radiation into the photomultiplier tube; and (iv) a focusing lens between the reflecting mirror and the photostimulable medium to focus the incident laser light on the photostimulable medium and to collimate response radiation emitted by the photostimulable medium.

3. The three-head scanning device of claim 2, further comprising:

a positioning system for moving the reflecting mirror and the focussing lens back and forth in a radial direction.

4. The three-head scanning device of claim 1, wherein the laser in each optical train is mounted to the rotatable frame at a location proximal the center of the rotatable frame, the laser emitting the incident laser light in a direction radially outwards from the center of the rotatable frame and wherein each optical train further comprises:

(i) a reflecting mirror mounted to the rotatable frame at a location proximal the outer perimeter of the rotatable frame, wherein the reflecting mirror is positioned to reflect the incident laser light in a direction generally normal to the direction radially outwards from the center of the rotatable frame;

(ii) a dichroic mirror mounted to the rotatable frame at a location proximal the outer perimeter of the rotatable frame, the dichroic mirror positioned to reflect the response radiation in a direction radially inwards to the center of the rotatable frame;

(iii) a steering mirror mounted to the rotatable frame at a location adjacent the photomultiplier tube, the steering mirror being positioned to reflect the response radiation into the photomultiplier tube; and (iv) a focusing lens between the reflecting mirror and the photostimulable medium to focus the incident laser light on the photostimulable medium and to collimate response radiation emitted by the photostimulable medium.

5. The three-head scanning device of claim 4, further comprising:

a positioning system for moving the reflecting mirror, the dichroic mirror and the focussing lens back and forth in a radial direction.

6. The three-head scanning device of claim 1, wherein the laser in each optical train is mounted to the rotatable frame at a location proximal the outer perimeter of the rotatable frame, the laser emitting the incident laser light in a direction generally normal to the rotatable frame and wherein each optical train further comprises:

(i) a dichroic mirror mounted to the rotatable frame at a location proximal the laser, the dichroic mirror positioned to reflect the response radiation in a direction radially inwards to the center of the rotatable frame; and (ii) a steering mirror mounted to the rotatable frame at a location adjacent the photomultiplier tube, the steering mirror being positioned to reflect the response radiation into the photomultiplier tube; and (iii) a focusing lens between the reflecting mirror and the photostimulable medium to focus the incident laser light on the photostimulable medium and to collimate response radiation emitted by the photostimulable medium.

7. The three-head scanning device of claim 6, further comprising:

a positioning system for moving the laser, the dichroic mirror and the focussing lens back and forth in a radial direction.

8. The three-head scanning device of claim 1, wherein the laser in each optical train is mounted to the rotatable frame at a location proximal the center of the rotatable frame, the laser emitting the incident laser light in a direction generally normal to a direction radially outwards from the center of the rotatable frame and wherein each optical train further comprises:

(i) a dichroic mirror mounted to the rotatable frame at a location adjacent the laser, the dichroic mirror positioned to reflect the incident laser light emitted by the laser in the direction radially outwards from the center of the rotatable frame;

(ii) a steering mirror mounted to the rotatable frame at a location adjacent the photomultiplier tube, the steering mirror being positioned to reflect the response radiation into the photomultiplier tube; and (iii) a focusing lens between the dichroic mirror and the photostimulable medium to focus the incident laser light on the photostimulable medium and to collimate response radiation emitted by the photostimulable medium.

9. The three-head scanning device of claim 8, further comprising:
a positioning system for moving the dichroic mirror and the focussing lens up and down in an axial direction.

10. The three-head scanning device of claim 1, wherein the laser in each optical train is mounted to the rotatable the frame at a location proximal the center of the rotatable frame, the laser emitting the incident laser light in a direction radially outwards from the center of the rotatable frame and wherein each optical train further comprises:
(i) a dichroic mirror mounted to the rotatable frame at a location proximal the outer perimeter of the rotatable frame, the dichroic mirror positioned to reflect the response radiation in a direction generally normal to the direction radially outwards from the center of the rotatable frame;
(ii) a reflecting mirror mounted to the rotatable frame at a location proximal the outer perimeter of the rotatable frame, wherein the reflecting mirror is positioned to reflect the response radiation in a direction radially inwards to the center of the rotatable frame;
(iii) a steering mirror mounted to the rotatable frame at a location adjacent the photomultiplier tube, the steeling mirror being positioned to reflect the response radiation into the photomultiplier tube; and
(iv) a focusing lens between the dichroic mirror and the photostimulable medium to focus the incident laser light on the photostimulable medium and to collimate response radiation emitted by the photostimulable medium.

11. The three-head scanning device of claim 10, further comprising:
a positioning system for moving the laser, the dichroic mirror and the focussing lens up and down in an axial direction.

12. The three-head scanning device of claim 1, wherein, the laser in each optical train is mounted to the rotatable frame at a location proximal the outer perimeter of the rotatable frame.

13. The three-head scanning device of claim 1, wherein, the laser in each optical train is mounted to the rotatable frame at a location proximal the center of the rotatable frame.

14. The three-head scanning device of claim 1, further comprising,
three steering mirrors mounted to the rotatable frame at a location adjacent the photomultiplier tube, the steering mirrors each configured to direct the response radiation into the photomultiplier tube.

15. The three-head scanning device of claim 2, 4, 6, 8 or 10, further comprising,
at least one red wavelength blocking filter positioned between the photomultiplier tube and each dichroic mirror.

16. The three-head scanning device of claim 1, wherein, the rotatable frame comprises a disc.

17. The three-head scanning device of claim 1, wherein, the rotatable frame comprises a Y-shaped frame having three radially extending arms attached together at the center of the frame.

18. The three-head scanning device of claim 2. 4, 6, 8 or 10, wherein, the focussing lens focuses a laser beam to a diameter of 25 to 250 microns.

19. The three-head scanning device of claim 18, wherein, the focussing lens focuses a laser beam to a diameter of about 50 to 80 microns.

20. The three-head scanning device of claim 1, further comprising:
mechanical shielding extending across a portion of the three-head scanning device, the mechanical shielding dimensioned to permit the incident laser light from only one of the three optical trains to reach the photostimulable medium at a time.

21. A system for reading an image stored on a photostimulable medium, comprising, in combination:
a photostimulable medium, and
a three-head scanning device comprising:
a rotatable frame having a center and an outer perimeter;
a photomultiplier tube disposed at a location proximal the center of the rotatable frame,
three lasers mounted to the rotatable frame, wherein each of the three lasers are mounted equidistant from the center of the rotatable frame and equidistant from one another;
three dichroic mirrors mounted to the rotatable frame, wherein each of the three dichroic mirrors are mounted equidistant from the center of the rotatable frame and equidistant from one another, each dichroic mirror directing laser light from one of the three lasers towards the photostimulable medium and each dichroic mirror directing response radiation from the photostimulable medium radially inwards towards the photomultiplier tube; and
three focusing lenses, each mounted between a reflecting mirror and the photostimulable medium to focus the incident laser light on the photostimulable medium and to collimate response radiation emitted by the photostimulable medium.

22. The system of claim 21, wherein,
the three lasers are mounted to the rotatable frame at locations proximal the center of the rotatable frame, and
the three dichroic mirrors are mounted to the rotatable frame at locations proximal the center of the rotatable frame.

23. The system of claim 22, further comprising,
three reflecting mirrors mounted to the rotatable frame at locations equidistant from the center of the rotatable frame and equidistant from one another, the three reflecting mirrors each configured to reflect the incident laser light towards the photostimulable medium and to reflect the response radiation emitted by the photostimulable medium in response to the incident laser light radially inwards towards the photomultiplier tube.

24. The system of claim 21, wherein,
the three lasers are mounted to the rotatable frame at locations proximal the center of the rotatable frame, and
the three dichroic mirrors are mounted to the rotatable frame at locations proximal the outer perimeter of the rotatable frame.

25. The system of claim 24, further comprising, three reflecting mirrors mounted to the rotatable frame at locations equidistant from the center of the rotatable frame and equidistant from one another, the three reflecting mirrors each configured to reflect the incident laser light towards the photostimulable medium.

26. The system of claim 24, further comprising, three reflecting mirrors mounted to the rotatable frame at locations equidistant from the center of the rotatable frame and equidistant from one another, the three reflecting mirrors each configured to reflect the response radiation emitted by the photostimulable medium in response to the incident laser light radially inwards towards the photomultiplier tube.

27. The system of claim 21, wherein, the three lasers are mounted to the rotatable frame at locations proximal the outer perimeter of the rotatable frame, and the three dichroic mirrors are mounted to the rotatable frame at locations proximal the outer perimeter of the rotatable frame.

28. The system as in claim 21, wherein, the scanning rotatable frame has an optical diameter of at least 1.1547 times the width of the photostimulable medium.

29. The system of claim 21, further comprising, a transport mechanism for moving the photostimulable medium in one direction.

30. The system of claim 22, further comprising, a positioning system for adjusting the position of the dichroic mirror in a radial direction, comprising a heating element mounted to a thermal expansion material, the thermal expansion material mounted to one of the three dichroic mirrors such that the expansion of the thermal expansion material causes one of the three dichroic mirrors to move in a radial direction.

31. The system of claim 23, further comprising, a positioning system for adjusting the position of the reflecting mirror in a radial direction, comprising a heating element mounted to a thermal expansion material, the thermal expansion material mounted to one of the three reflecting mirrors such that the expansion of the thermal expansion material causes one of the three reflecting mirrors to move in a radial direction.

32. The system of claims 30 or 31, further comprising, a bi-cell mounted adjacent the rotatable frame at a location at the perimeter of the rotating frame, the bi-cell comprising a pair of light detectors for determining the optical radius of each of the successive scanning heads by determining the radial distance from the center of the rotating frame to a focussed laser spot under each of the scanning heads.

33. The system of claims 30 or 31, further comprising, a CCD mounted under the rotatable frame at a location at the perimeter of the rotating frame for determining the optical radius of each of the successive scanning heads by determining the radial distance from the center of the rotating frame to a focussed laser spot under each of the scanning heads.

34. A method of reading an image stored on a photostimulable medium, comprising:

rotating a three-head scanning device over the surface of the photostimulable medium, the three-head scanning device comprising three equidistantly spaced-apart scanning heads disposed about a common center at angles of 120 degrees to one another, such that each scanning head successively traces an path across the surface of the photostimulable medium, wherein each scanning head is configured to direct incident laser light from a dedicated laser source towards the photostimulable medium and to direct response radiation emitted by the photostimulable medium towards a photomultiplier tube disposed at the common center;

activating each of the scanning heads by emitting incident laser light from a laser source dedicated to the scanning head;

measuring the response radiation emitted by the photostimulable medium with the photomultiplier tube, thereby gathering image data in polar coordinate form; and advancing the photostimulable medium in a first direction.

35. The method of claim 34, wherein, each of the three scanning heads is activated in sequence such that only one scanning head is gathering image data at a time.

36. The method of claim 34, wherein, the photostimulable medium is advanced in incremental steps in the first direction.

37. The method of claim 34, wherein, the photostimulable medium is advanced continuously in the first direction.

38. The method of claim 34, further comprising, transforming the image data from polar coordinate form into Cartesian form, thereby generating a straight-line X-Y raster scan of the photostimulable medium.

39. The method of claim 34, farther comprising, dimensioning the optical diameter of the three-head scanning device to be at least 1.1547 times the width of the photostimulable medium.

40. The method of claim 34, wherein, the photostimulable medium is planar and is disposed parallel to a plane defined by the three equidistantly spaced apart scanning heads.

41. The method of claim 40, wherein, the first direction is parallel to the plane defined by the three equidistantly spaced apart scanning heads.

42. The method of claim 34, wherein, the photostimulable medium is wrapped partially around the perimeter of the scanning device, and the first direction is perpendicular to a plane defined by the three equidistantly spaced apart scanning heads.

43. The method of claim 41, wherein, =p1 the photostimulable medium is wrapped not more than 120° around the perimeter of the scanning device.

44. A multiple-head scanning device for reading an image stored on a photostimulable medium, comprising, a rotatable frame having a center and an outer perimeter;

at least one photomultiplier tube disposed at a location proximal the center of the rotatable frame; and a plurality of radially extending optical trains mounted to the rotatable frame, each optical train configured to direct incident laser light towards the photostimulable medium and to direct response radiation emitted by the photostimulable medium in response to the incident laser light towards the photomultiplier tube, each optical train comprising a laser.

45. The multiple-head scanning device of claim 44, wherein the laser in each optical train is mounted to the rotatable frame at a location proximal the center of the rotatable frame, the laser emitting the incident laser light in a direction generally normal to a direction radially outwards from the center of the rotatable frame and wherein each optical train further comprises:
- (i) a dichroic mirror mounted to the rotatable frame at a location adjacent the laser, the dichroic mirror positioned to reflect the incident laser light emitted by the laser in the direction radially outwards from the center of the rotatable frame;
- (ii) a reflecting mirror mounted to the rotatable frame at a location proximal the outer perimeter of the rotatable frame, wherein the reflecting mirror is positioned to reflect the incident laser light in the direction generally normal to the direction radially outwards from the center of the rotatable frame;
- (iii) a steering mirror mounted to the rotatable frame at a location adjacent the photomultiplier tube, the steering mirror being positioned to reflect the response radiation into the photomultiplier tube; and
- (iv) a focusing lens between the reflecting mirror and the photostimulable medium to focus the incident laser light on the photostimulable medium and to collimate response radiation emitted by the photostimulable medium.

46. The multiple-head scanning device of claim 44, wherein the laser in each optical train is mounted to the rotatable frame at a location proximal the center of the rotatable frame, the laser emitting the incident laser light in a direction radially outwards from the center of the rotatable frame and wherein each optical train further comprises:
- (i) a reflecting mirror mounted to the rotatable frame at a location proximal the outer perimeter of the rotatable frame, wherein the reflecting mirror is positioned to reflect the incident laser light in a direction generally normal to the direction radially outwards from the center of the rotatable frame;
- (ii) a dichroic mirror mounted to the rotatable frame at a location proximal the outer perimeter of the rotatable frame, the dichroic mirror positioned to reflect the response radiation in a direction radially inwards to the center of the rotatable frame;
- (iii) a steering mirror mounted to the rotatable frame at a location adjacent the photomultiplier tube, the steering mirror being positioned to reflect the response radiation into the photomultiplier tube; and
- (iv) a focusing lens between the reflecting mirror and the photostimulable medium to focus the incident laser light on the photostimulable medium and to collimate response radiation emitted by the photostimulable medium.

47. The multiple-head scanning device of claim 44, wherein the laser in each optical train is mounted to the rotatable frame at a location proximal the outer perimeter of the rotatable frame, the laser emitting the incident laser light in a direction generally normal to the rotatable frame and wherein each optical train further comprises:
- (i) a dichroic mirror mounted to the rotatable frame at a location proximal the laser, the dichroic mirror positioned to reflect the response radiation in a direction radially inwards to the center of the rotatable frame; and
- (ii) a steering mirror mounted to the rotatable frame at a location adjacent the photomultiplier tube, the steering mirror being positioned to reflect the response radiation into the photomultiplier tube; and
- (iii) a focusing lens between the reflecting mirror and the photostimulable medium to focus the incident laser light on the photostimulable medium and to collimate response radiation emitted by the photostimulable medium.

48. The multiple-head scanning device of claim 44, wherein the laser in each optical train is mounted to the rotatable frame at a location proximal the center of the rotatable frame, the laser emitting the incident laser light in a direction generally normal to a direction radially outwards from the center of the rotatable frame and wherein each optical train further comprises:
- (i) a dichroic mirror mounted to the rotatable frame at a location adjacent the laser, the dichroic mirror positioned to reflect the incident laser light emitted by the laser in the direction radially outwards from the center of the rotatable frame;
- (ii) a steering mirror mounted to the rotatable frame at a location adjacent the photomultiplier tube, the steering mirror being positioned to reflect the response radiation into the photomultiplier tube; and
- (iii) a focusing lens between the dichroic mirror and the photostimulable medium to focus the incident laser light on the photostimulable medium and to collimate response radiation emitted by the photostimulable medium.

49. The multiple-head scanning device of claim 44, wherein the laser in each optical train is mounted to the rotatable frame at a location proximal the center of the rotatable frame, the laser emitting the incident laser light in a direction radially outwards from the center of the rotatable frame and wherein each optical train further comprises:
- (i) a dichroic mirror mounted to the rotatable frame at a location proximal the outer perimeter of the rotatable frame, the dichroic mirror positioned to reflect the response radiation in a direction generally normal to the direction radially outwards from the center of the rotatable frame;
- (ii) a reflecting mirror mounted to the rotatable frame at a location proximal the outer perimeter of the rotatable frame, wherein the reflecting mirror is positioned to reflect the response radiation in a direction radially inwards to the center of the rotatable frame;
- (iii) a steering mirror mounted to the rotatable frame at a location adjacent the photomultiplier tube, the steering mirror being positioned to reflect the response radiation into the photomultiplier tube; and
- (iv) a focusing lens between the dichroic mirror and the photostimulable medium to focus the incident laser light on the photostimulable medium and to collimate response radiation emitted by the photostimulable medium.

50. A method of reading an image stored on a photostimulable medium, comprising:
- rotating a multiple-head scanning device over the surface of the photostimulable medium, the multiple-head scanning device comprising a plurality of radially extending optical trains each having a scanning head disposed proximal an outer perimeter of the scanning device, such that each scanning head successively traces an path across the surface of the photostimulable medium, wherein each scanning head is configured to direct incident laser light from a laser source towards the photostimulable medium and to direct response radiation emitted by the photostimulable medium towards a photomultiplier tube disposed at the common center;

activating each of the scanning heads by emitting incident laser light from a laser source dedicated to the scanning head each optical train comprising a laser;

measuring the response radiation emitted by the photostimulable medium with the photomultiplier tube, thereby gathering image data in polar coordinate form; and advancing the photostimulable medium in a first direction.

51. The method of claim 50, wherein, each of the scanning heads is activated in sequence such that only one scanning head is gathering image data at a time.

52. The method of claim 50, wherein, each of the laser sources are operated continuously and mechanical shielding is provided such that only one scanning head is gathering image data at a time.

53. The method of claim 50, further comprising, transforming the image data from polar coordinate form into Cartesian form, thereby generating a straight-line X-Y raster scan of the photostimulable medium.

54. The method of claim 50, wherein, the photostimulable medium is planar and is disposed parallel to a plane defined by the scanning heads.

55. The method of claim 54, wherein,
the first direction is parallel to the plane defined by the scanning heads.

56. The method of claim 50, wherein,
the photostimulable medium is wrapped partially around the perimeter of the scanning device, and the first direction is perpendicular to a plane defined by the scanning heads.

57. A system for reading an image stored on a photostimulable medium, comprising, in combination:
a photostimulable medium, and
a three-head scanning device comprising:
a rotatable frame having a center and an outer perimeter;
a photomultiplier tube disposed at a location proximal the center of the rotatable frame,
three lasers mounted to the rotatable frame at locations proximal the center of the rotatable frame, wherein each of the three lasers are mounted equidistant from the center of the rotatable frame and equidistant from one another;
three dichroic mirrors mounted to the rotatable frame at locations proximal the center of the rotatable frame, wherein each of the three dichroic mirrors are mounted equidistant from the center of the rotatable frame, each dichroic mirror directing laser light from one of the three lasers towards the photostimulable medium and each dichroic mirror directing response radiation from the photostimulable medium radially inwards towards the photomultiplier tube;
three focusing lenses, each mounted between a reflecting mirror and the photostimulable medium to focus the incident laser light on the photostimulable medium and to collimate response radiation emitted by the photostimulable medium;
a positioning system for adjusting the position of the dichroic mirror in a radial direction, comprising a heating element mounted to a thermal expansion material, the thermal expansion material mounted to the dichroic mirror such that the expansion of the thermal expansion material causes the dichroic mirror to move in a radial direction; and
a bi-cell mounted adjacent the rotatable frame at a location at the perimeter of the rotating frame, the bi-cell comprising a pair of light detectors for determining the optical radius of each of the successive scanning heads by determining the radial distance from the center of the rotating frame to a focussed laser spot under each of the scanning heads.

58. A system for reading an image stored on a photostimulable medium, comprising, in combination:
a photostimulable medium, and
a three-head scanning device comprising:
a rotatable frame having a center and an outer perimeter;
a photomultiplier tube disposed at a location proximal the center of the rotatable frame,
three lasers mounted to the rotatable frame at locations proximal the center of the rotatable frame, wherein each of the three lasers are mounted equidistant from the center of the rotatable frame and equidistant from one another;
three dichroic mirrors mounted to the rotatable frame at locations proximal the center of the rotatable frame, wherein each of the three dichroic mirrors are mounted equidistant from the center of the rotatable frame, each dichroic mirror directing laser light from at least one of the three lasers towards the photostimulable medium and each dichroic mirror directing response radiation from the photostimulable medium radially inwards towards the photomultiplier tube;
three focusing lenses, each mounted between a reflecting mirror and the photostimulable medium to focus the incident laser light on the photostimulable medium and to collimate response radiation emitted by the photostimulable medium;
a positioning system for adjusting the position of the dichroic mirror in a radial direction, comprising a heating element mounted to a thermal expansion material, the thermal expansion material mounted to the dichroic mirror such that the expansion of the thermal expansion material causes the dichroic mirror to move in a radial direction; and
a CCD mounted under the rotatable frame at a location at the perimeter of the rotating frame for determining the optical radius of each of the successive scanning heads by determining the radial distance from the center of the rotating frame to a focussed laser spot under each of the scanning heads.

59. A method of reading an image stored on a photostimulable medium, comprising:
rotating a three-head scanning device over the surface of the photostimulable medium, the three-head scanning device comprising three spaced-apart scanning heads disposed about a common center, such that each scanning head successively traces an path across the surface of the photostimulable medium, wherein each scanning head is configured to direct incident laser light from a laser source towards the photostimulable medium and to direct response radiation emitted by the photostimulable medium towards a photomultiplier tube disposed at the common center;
activating each of the scanning heads by emitting incident laser light from a laser source dedicated to the scanning head, wherein each of the three scanning heads is activated in sequence such that only one scanning head is gathering image data at a time; and measuring the response radiation emitted by the photostimulable medium with the photomultiplier tube, thereby gathering image data in polar coordinate form; and advancing the photostimulable medium in a first direction.

60. A method of reading an image stored on a photostimulable medium, comprising:

rotating a multiple-head scanning device over the surface of the photostimulable medium, the multiple-head scanning device comprising a plurality of radially extending optical trains each having a scanning head disposed proximal an outer perimeter of the scanning device, such that each scanning head successively traces a path across the surface of the photostimulable medium, wherein each scanning head is configured to direct incident laser light from a laser source towards the photostimulable medium and to direct response radiation emitted by the photostimulable medium towards a photomultiplier tube disposed at the common center;

activating each of the scanning heads by emitting incident laser light from a laser source dedicated to the scanning head, wherein each of the three scanning heads is activated in sequence such that only one scanning head is gathering image data at a time;

measuring the response radiation emitted by the photostimulable medium with the photomultiplier tube, thereby gathering image data in polar coordinate form; and advancing the photostimulable medium in a first direction.

61. A method of reading an image stored on a photostimulable medium, comprising:

rotating a multiple-head scanning device over the surface of the photostimulable medium, the multiple-head scanning device comprising a plurality of radially extending optical trains each having a scanning head disposed proximal an outer perimeter of the scanning device, such that each scanning head successively traces a path across the surface of the photostimulable medium, wherein each scanning head is configured to direct incident laser light from a laser source towards the photostimulable medium and to direct response radiation emitted by the photostimulable medium towards a photomultiplier tube disposed at the common center;

activating each of the scanning heads by emitting incident laser light from a laser source dedicated to the scanning head, wherein each of the laser sources are operated continuously and mechanical shielding is provided such that only one scanning head is gathering image data at a time;

measuring the response radiation emitted by the photostimulable medium with the photomultiplier tube, thereby gathering image data in polar coordinate form; and advancing the photostimulable medium in a first direction.

62. A three-head scanning device for reading an image stored on a photostimulable medium, comprising, a rotatable frame having a center and an outer perimeter;

at least one photomultiplier tube disposed at a location proximal the center of the rotatable frame;

three radially extending optical trains mounted to the rotatable frame, each optical train configured to direct incident laser light towards the photostimulable medium and to direct response radiation emitted by the photostimulable medium in response to the incident laser light towards the photomultiplier tube, each optical train comprising:

(i) a laser mounted to the rotatable frame at a location proximal the center of the rotatable frame, the laser emitting the incident laser light in a direction generally nonnull to a direction radially outwards from the center of the rotatable frame;

(ii) a dichroic mirror mounted to the rotatable frame at a location adjacent the laser, the dichroic mirror positioned to reflect the incident laser light emitted by the laser in the direction radially outwards from the center of the rotatable frame;

(iii) a reflecting mirror mounted to the rotatable frame at a location proximal the outer perimeter of the rotatable frame, wherein the reflecting mirror is positioned to reflect the incident laser light in the direction generally normal to the direction radially outwards from the center of the rotatable frame;

(iv) a steering mirror mounted to the rotatable frame at a location adjacent the photomultiplier tube, the steering mirror being positioned to reflect the response radiation into the photomultiplier tube; and (v) a focusing lens between the reflecting mirror and the photostimulable medium to focus the incident laser light on the photostimulable medium and to collimate response radiation emitted by the photostimulable medium; and a positioning system for moving the reflecting mirror and the focussing lens back and forth in a radial direction.

63. A three-head scanning device for reading an image stored on a photostimulable medium, comprising, a rotatable frame having a center and an outer perimeter;

at least one photomultiplier tube disposed at a location proximal the center of the rotatable frame;

three radially extending optical trains mounted to the rotatable frame, each optical train configured to direct incident laser light towards the photostimulable medium and to direct response radiation emitted by the photostimulable medium in response to the incident laser light towards the photomultiplier tube, wherein each optical train comprises:

(i) a laser mounted to the rotatable frame at a location proximal the center of the rotatable frame, the laser emitting the incident laser light in a direction radially outwards from the center of the rotatable frame;

(ii) a reflecting mirror mounted to the rotatable frame at a location proximal the outer perimeter of the rotatable frame, wherein the reflecting mirror is positioned to reflect the incident laser light in a direction generally nominal to the direction radially outwards from the center of the rotatable frame;

(iii) a dichroic mirror mounted to the rotatable frame at a location proximal the outer perimeter of the rotatable frame, the dichroic mirror positioned to reflect the response radiation in a direction radially inwards to the center of the rotatable frame;

(iv) a steering mirror mounted to the rotatable frame at a location adjacent the photomultiplier tube, the steering mirror being positioned to reflect the response radiation into the photomultiplier tube; and (v) a focusing lens between the reflecting mirror and the photostimulable medium to focus the incident laser light on the photostimulable medium and to collimate response radiation emitted by the photostimulable medium; and
a positioning system for moving the reflecting mirror, the dichroic mirror and the focussing lens back and forth in a radial direction.

64. A three-head scanning device for reading an image stored on a photostimulable medium, comprising, a rotatable frame having a center and an outer perimeter;
at least one photomultiplier tube disposed at a location proximal the center of the rotatable frame;
three radially extending optical trains mounted to the rotatable frame, each optical train configured to direct incident laser light towards the photostimulable medium and to direct response radiation emitted by the photostimulable medium in response to the incident laser light towards the photomultiplier tube, wherein each optical train comprises:
(i) a laser mounted to the rotatable frame at a location proximal the outer perimeter of the rotatable frame, the laser emitting the incident laser light in a direction generally normal to the rotatable frame;
(ii) a dichroic mirror mounted to the rotatable frame at a location proximal the laser, the dichroic mirror positioned to reflect the response radiation in a direction radially inwards to the center of the rotatable frame; and
(iii) a steering mirror mounted to the rotatable frame at a location adjacent the photomultiplier tube, the steering mirror being positioned to reflect the response radiation into the photomultiplier tube; and
(iv) a focusing lens between the reflecting mirror and the photostimulable medium to focus the incident laser light on the photostimulable medium and to collimate response radiation emitted by the photostimulable medium; and
a positioning system for moving the laser, the dichroic mirror and the focussing lens back and forth in a radial direction.

65. A three-head scanning device for reading an image stored on a photostimulable medium, comprising,
a rotatable frame having a center and an outer perimeter;
at least one photomultiplier tube disposed at a location proximal the center of the rotatable frame;
three radially extending optical trains mounted to the rotatable frame, each optical train configured to direct incident laser light towards the photostimulable medium and to direct response radiation emitted by the photostimulable medium in response to the incident laser light towards the photomultiplier tube, wherein each optical train comprises:
(i) a laser mounted to the rotatable frame at a location proximal the center of the rotatable frame, the laser emitting the incident laser light in a direction generally normal to a direction radially outwards from the center of the rotatable frame
(ii) a dichroic mirror mounted to the rotatable frame at a location adjacent the laser, the dichroic mirror positioned to reflect the incident laser light emitted by the laser in the direction radially outwards from the center of the rotatable frame;
(iii) a steering mirror mounted to the rotatable frame at a location adjacent the photomultiplier tube, the steering mirror being positioned to reflect the response radiation into the photomultiplier tube; and
(iv) a focusing lens between the dichroic mirror and the photostimulable medium to focus the incident laser light on the photostimulable medium and to collimate response radiation emitted by the photostimulable medium; and
a positioning system for moving the dichroic mirror and the focussing lens up and down in an axial direction.

66. A three-head scanning device for reading an image stored on a photostimulable medium, comprising,
a rotatable frame having a center and an outer perimeter;
at least one photomultiplier tube disposed at a location proximal the center of the rotatable frame;
three radially extending optical trains mounted to the rotatable frame, each optical train configured to direct incident laser light towards the photostimulable medium and to direct response radiation emitted by the photostimulable medium in response to the incident laser light towards the photomultiplier tube, wherein each optical train comprises:
(i) a laser mounted to the rotatable frame at a location proximal the center of the rotatable frame, the laser emitting the incident laser light in a direction radially outwards from the center of the rotatable frame;
(ii) a dichroic mirror mounted to the rotatable frame at a location proximal the outer perimeter of the rotatable frame, the dichroic mirror positioned to reflect the response radiation in a direction generally normal to the direction radially outwards from the center of the rotatable frame;
(iii) a reflecting mirror mounted to the rotatable frame at a location proximal the outer perimeter of the rotatable frame, wherein the reflecting mirror is positioned to reflect the response radiation in a direction radially inwards to the center of the rotatable frame;
(iv) a steering mirror mounted to the rotatable frame at a location adjacent the photomultiplier tube, the steering mirror being positioned to reflect the response radiation into the photomultiplier tube; and
(v) a focusing lens between the dichroic mirror and the photostimulable medium to focus the incident laser light on the photostimulable medium and to collimate response radiation emitted by the photostimulable medium; and
a positioning system for moving the laser, the dichroic mirror and the focussing lens up and down in an axial direction.

67. A method of reading an image stored on a photostimulable medium, comprising:
rotating a three-head scanning device over the surface of the photostimulable medium, the three-head scanning device comprising three spaced-apart scanning heads disposed about a common center, such that each scanning head successively traces a path across the surface of the photostimulable medium, wherein each scanning head is configured to direct incident laser light from a laser source towards the photostimulable medium and to direct response radiation emitted by the photostimulable medium towards a photomultiplier tube disposed at the common center, wherein the optical diameter of the three-head scanning device is dimensioned to be at least 1.1547 times the width of the photostimulable medium;
activating each of the scanning heads by emitting incident laser light from a laser source dedicated to the scanning head;

measuring the response radiation emitted by the photostimulable medium with the photomultiplier tube, thereby gathering image data in polar coordinate form; and advancing the photostimulable medium in a first direction.

68. A method of reading an image stored on a photostimulable medium, comprising:

rotating a multiple-head scanning device over the surface of the photostimulable medium, the multiple-head scanning device comprising a plurality of radially extending optical trains each having a scanning head disposed proximal an outer perimeter of the scanning device, such that each scanning head successively traces an path across the surface of the photostimulable medium, wherein each scanning head is configured to direct incident laser light from a laser source towards the photostimulable medium and to direct response radiation emitted by the photostimulable medium towards a photomultiplier tube disposed at the common center;

activating each of the scanning heads by emitting incident laser light from a laser source dedicated to the scanning head, wherein each of the scanning heads is activated in sequence such that only one scanning head is gathering image data at a time;

measuring the response radiation emitted by the photostimulable medium with the photomultiplier tube, thereby gathering image data in polar coordinate form; and advancing the photostimulable medium in a first direction.

69. The system of claim 22, further comprising, a positioning system for adjusting the position of the dichroic mirror in a radial direction.

70. The system of claim 23, further comprising, a positioning system for adjusting the position of the reflecting mirror in a radial direction.

71. The system of claims 69 or 70, further comprising, a system for determining the optical radius of each of the successive scanning heads by determining the radial distance from the center of the rotating frame to a focussed laser spot under each of the scanning heads.

* * * * *